United States Patent
Hudyma et al.

(10) Patent No.: US 10,386,604 B1
(45) Date of Patent: Aug. 20, 2019

(54) COMPACT WIDE FIELD OF VIEW DIGITAL CAMERA WITH STRAY LIGHT IMPACT SUPPRESSION

(71) Applicant: Navitar Industries, LLC, Rochester, NY (US)

(72) Inventors: Russell Hudyma, San Ramon, CA (US); Michael Thomas, Woburn, MA (US); Ian Wallhead, La Eliana-Valencia (ES); Arash Ghorbani, Auburn, CA (US)

(73) Assignee: Navitar Industries, LLC, Rochester, NY (US)

(*) Notice: Subject to any disclaimer, the term of this patent is extended or adjusted under 35 U.S.C. 154(b) by 245 days.

(21) Appl. No.: 14/932,748

(22) Filed: Nov. 4, 2015

Related U.S. Application Data

(63) Continuation-in-part of application No. 14/810,377, filed on Jul. 27, 2015, now Pat. No. 9,726,859, which
(Continued)

(51) Int. Cl.
| | |
|---|---|
| *G02B 9/64* | (2006.01) |
| *G02B 13/00* | (2006.01) |
| *G02B 13/04* | (2006.01) |
| *G02B 13/22* | (2006.01) |
| *G02B 27/00* | (2006.01) |

(Continued)

(52) U.S. Cl.
CPC .......... *G02B 13/0045* (2013.01); *G02B 9/64* (2013.01); *G02B 13/006* (2013.01); *G02B 13/04* (2013.01); *G02B 13/22* (2013.01); *G02B 27/0018* (2013.01); *G02B 27/0025* (2013.01); *H04N 5/2252* (2013.01); *H04N 5/23238* (2013.01)

(58) Field of Classification Search
CPC ... G02B 13/002–13/0045; G02B 13/04; G02B 9/64
USPC ......... 359/708–719, 676–693, 749–753, 754
See application file for complete search history.

(56) References Cited

U.S. PATENT DOCUMENTS

| | | | |
|---|---|---|---|
| 3,931,629 A | 1/1976 | Himmelsbach | |
| 3,953,111 A | 4/1976 | Fisher et al. | |

(Continued)

FOREIGN PATENT DOCUMENTS

| | | |
|---|---|---|
| DE | 10 2010 020 243 B4 | 3/2012 |
| EP | 1393133 B1 | 10/2005 |

(Continued)

OTHER PUBLICATIONS

Hollows Gregory and Nicholas James. "Resolutions—Edmond Optics." Edmund Optics Worldwide Edmund Optics Aug. 28, 2017 www.edmundoptics.com/resources/application-notes/imaging/resolution/.
(Continued)

*Primary Examiner* — Zachary W Wilkes
(74) *Attorney, Agent, or Firm* — SF Bay Area Patents, LLC; Andrew V. Smith

(57) ABSTRACT

A point action camera or other compact digital camera having a wide field of view, includes an optical assembly that includes multiple lens elements, including at least one lens element that has an aspheric lens surface. The optical assembly is configured to provide a field of view in excess of 120 degrees. The digital camera is configured such that not less than 90% of return ghosts foci are more than +/−2 mm from the image sensor plane.

22 Claims, 16 Drawing Sheets

Related U.S. Application Data is a continuation-in-part of application No. 14/215,056, filed on Mar. 16, 2014, now Pat. No. 9,091,843.

(60) Provisional application No. 62/075,161, filed on Nov. 4, 2014.

(51) Int. Cl.
*H04N 5/225* (2006.01)
*H04N 5/232* (2006.01)

(56) References Cited

U.S. PATENT DOCUMENTS

| | | |
|---|---|---|
| 4,008,951 A | 2/1977 | Himmelsbach |
| 4,009,946 A | 3/1977 | Geyer et al. |
| 4,015,896 A | 4/1977 | Sonnet |
| 4,036,571 A | 7/1977 | Geyer et al. |
| 4,054,372 A | 10/1977 | Schroeder |
| 4,079,401 A | 3/1978 | Baab et al. |
| 4,081,811 A | 3/1978 | Baab et al. |
| 4,101,202 A | 7/1978 | Tesch |
| 4,107,714 A | 8/1978 | Raab |
| 4,110,769 A | 8/1978 | Schutz et al. |
| 4,119,294 A | 10/1978 | Schnorrenberg |
| 4,161,756 A | 7/1979 | Thomas |
| 4,168,884 A | 9/1979 | Tesch |
| 4,182,565 A | 1/1980 | Bauer |
| 4,196,970 A | 4/1980 | Macher et al. |
| 4,200,377 A | 4/1980 | Holderbaum |
| 4,229,094 A | 10/1980 | Baab et al. |
| 4,239,339 A | 12/1980 | Wagner |
| 4,273,415 A | 6/1981 | Sonnet |
| 4,353,634 A | 10/1982 | Himmelsbach |
| 4,384,769 A | 5/1983 | Brei et al. |
| 4,645,314 A | 2/1987 | Schroder |
| 4,695,136 A | 9/1987 | Schitthof |
| 4,756,601 A | 7/1988 | Schroder |
| 4,773,745 A | 9/1988 | Schitthof |
| 4,948,237 A | 8/1990 | Hirata et al. |
| 5,251,073 A | 10/1993 | Schauss |
| 5,327,290 A | 7/1994 | Fukushima et al. |
| 5,339,193 A | 8/1994 | Korpert et al. |
| 5,430,564 A | 7/1995 | Harada et al. |
| 5,453,785 A | 9/1995 | Lenhardt et al. |
| 5,477,389 A * | 12/1995 | Ito ................... G02B 13/04 359/708 |
| 5,692,820 A | 12/1997 | Gale et al. |
| 5,708,532 A | 1/1998 | Wartmann |
| 5,745,285 A | 4/1998 | Harder et al. |
| 5,870,234 A | 2/1999 | Ebbesmeier nee Schitthof |
| 5,882,221 A | 3/1999 | Nguyen et al. |
| 5,940,222 A | 8/1999 | Sinclai et al. |
| 5,973,826 A | 10/1999 | Chapman et al. |
| 6,000,798 A | 12/1999 | Chipman |
| 6,005,720 A | 12/1999 | Watters et al. |
| 6,028,720 A | 2/2000 | Wartmann et al. |
| 6,033,079 A | 3/2000 | Hudyma |
| 6,072,852 A | 6/2000 | Hudyma |
| 6,086,203 A | 7/2000 | Blum |
| 6,147,818 A | 11/2000 | Hale et al. |
| 6,183,084 B1 | 2/2001 | Chipman |
| 6,183,095 B1 | 2/2001 | Hudyma |
| 6,188,513 B1 | 2/2001 | Hudyma et al. |
| 6,204,975 B1 | 3/2001 | Watters et al. |
| 6,226,346 B1 | 5/2001 | Hudyma |
| 6,262,836 B1 | 7/2001 | Hudyma et al. |
| 6,282,033 B1 | 8/2001 | Ning |
| 6,310,731 B1 | 10/2001 | Wartmann et al. |
| 6,318,869 B1 | 11/2001 | Hudyma |
| 6,339,509 B1 | 1/2002 | Ohtake |
| 6,426,506 B1 | 7/2002 | Hudyma |
| 6,441,971 B2 | 8/2002 | Ning |
| 6,454,408 B1 | 9/2002 | Morris |
| 6,554,330 B2 | 4/2003 | Wen-Bin et al. |
| 6,583,444 B2 | 6/2003 | Fjelstad |
| 6,636,350 B2 | 10/2003 | Shafer et al. |
| 6,836,382 B2 | 12/2004 | Ning |
| 6,844,991 B2 | 1/2005 | Mizuguchi |
| 6,864,861 B2 | 3/2005 | Schehrer et al. |
| 6,867,889 B1 | 3/2005 | Amadon et al. |
| 6,888,168 B2 | 5/2005 | Fjelstad |
| 6,906,866 B2 | 6/2005 | Hudyma et al. |
| 6,927,901 B2 | 8/2005 | Mann et al. |
| RE38,799 E | 9/2005 | Ning |
| 6,985,210 B2 | 1/2006 | Hudyma et al. |
| 6,989,937 B2 | 1/2006 | Schauss |
| 7,009,140 B2 | 3/2006 | Partio et al. |
| 7,023,628 B1 | 4/2006 | Ning |
| 7,057,830 B2 | 6/2006 | Ebbesmeier |
| 7,061,959 B2 | 6/2006 | Partio et al. |
| 7,085,075 B2 | 8/2006 | Mann et al. |
| 7,095,054 B2 | 8/2006 | Fjelstad |
| 7,126,760 B2 * | 10/2006 | Yamada ............... G02B 15/173 359/683 |
| 7,151,592 B2 | 12/2006 | Hudyma et al. |
| 7,173,774 B2 | 2/2007 | Ning |
| 7,190,527 B2 | 3/2007 | Rostalski et al. |
| 7,190,530 B2 | 3/2007 | Mann et al. |
| 7,199,122 B2 | 4/2007 | Ruggeri et al. |
| 7,199,922 B2 | 4/2007 | Mann et al. |
| 7,218,445 B2 | 5/2007 | Shafer et al. |
| 7,224,056 B2 | 5/2007 | Burtzlaff et al. |
| 7,237,915 B2 | 7/2007 | Hudyma |
| 7,237,935 B2 | 7/2007 | Ito et al. |
| 7,244,056 B2 | 7/2007 | Koike et al. |
| 7,345,277 B2 | 3/2008 | Zhang |
| 7,355,678 B2 | 4/2008 | Hudyma et al. |
| 7,368,695 B2 | 5/2008 | Kang et al. |
| 7,375,798 B2 | 5/2008 | Hudyma et al. |
| 7,382,540 B2 | 6/2008 | Rostalski et al. |
| 7,443,597 B2 | 10/2008 | Humpston |
| 7,449,779 B2 | 11/2008 | Honer et al. |
| 7,508,581 B2 | 3/2009 | Hudyma |
| 7,529,040 B2 | 5/2009 | Bretthauer |
| 7,545,572 B2 | 6/2009 | Bretthauer et al. |
| 7,566,853 B2 | 7/2009 | Tuckerman et al. |
| 7,569,424 B2 | 8/2009 | Nystrom et al. |
| 7,593,636 B2 | 9/2009 | Nystrom et al. |
| 7,675,694 B2 | 3/2010 | Kim et al. |
| 7,683,468 B2 | 3/2010 | Haba et al. |
| 7,747,155 B1 | 6/2010 | Gutierrez |
| 7,768,574 B2 | 8/2010 | Humpston |
| 7,791,825 B2 | 9/2010 | Hackemer |
| 7,807,508 B2 | 10/2010 | Oganesian et al. |
| 7,839,532 B2 | 11/2010 | Brawn et al. |
| 7,858,445 B2 | 12/2010 | Honer et al. |
| 7,859,748 B2 | 12/2010 | Shafer et al. |
| 7,864,452 B2 | 1/2011 | Ning |
| 7,869,141 B2 | 1/2011 | Ning |
| RE42,118 E | 2/2011 | Hudyma et al. |
| 7,884,303 B2 | 2/2011 | Partlo et al. |
| 7,885,008 B2 | 2/2011 | Schauss |
| 7,920,163 B1 | 4/2011 | Kossin |
| 7,927,070 B2 | 4/2011 | Godsk et al. |
| 7,929,219 B2 | 4/2011 | Togino |
| 7,929,221 B2 | 4/2011 | Ning |
| 7,935,568 B2 | 5/2011 | Oganesian et al. |
| 7,936,062 B2 | 5/2011 | Humpston et al. |
| 8,004,780 B2 | 8/2011 | Gutierrez et al. |
| 8,005,268 B2 | 8/2011 | Steinberg et al. |
| 8,014,662 B1 | 9/2011 | Gutierrez et al. |
| 8,089,698 B1 | 1/2012 | Tang et al. |
| 8,090,252 B1 | 1/2012 | Tang et al. |
| 8,119,516 B2 | 2/2012 | Endo |
| 8,135,184 B2 | 3/2012 | Steinberg et al. |
| 8,184,967 B2 | 5/2012 | Tang et al. |
| 8,189,276 B1 | 5/2012 | Hsu et al. |
| 8,199,222 B2 | 6/2012 | Drimbarean et al. |
| 8,212,882 B2 | 7/2012 | Florea et al. |
| 8,264,576 B2 | 9/2012 | Susanu et al. |
| 8,330,831 B2 | 12/2012 | Steinberg et al. |
| 8,351,726 B2 | 1/2013 | Albu et al. |
| 8,358,925 B2 | 1/2013 | Gutierrez et al. |
| 8,362,391 B2 | 1/2013 | Partlo et al. |

(56) References Cited

U.S. PATENT DOCUMENTS

| | | |
|---|---|---|
| 8,363,085 B2 | 1/2013 | Michrowski et al. |
| 8,417,055 B2 | 4/2013 | Albu et al. |
| 8,493,459 B2 | 7/2013 | Albu |
| 8,493,460 B2 | 7/2013 | Albu |
| 8,508,652 B2 | 8/2013 | Albu et al. |
| 8,509,496 B2 | 8/2013 | Steinberg et al. |
| 8,521,017 B2 | 8/2013 | Calvet et al. |
| 8,547,423 B2 | 10/2013 | Ning |
| 8,587,666 B2 | 11/2013 | Albu et al. |
| 8,593,542 B2 | 11/2013 | Steinberg et al. |
| 8,604,663 B2 | 12/2013 | Gutierrez et al. |
| 8,637,961 B2 | 1/2014 | Gutierrez et al. |
| 8,648,959 B2 | 2/2014 | Capata et al. |
| 8,649,627 B2 | 2/2014 | Albu et al. |
| 8,649,628 B2 | 2/2014 | Albu et al. |
| 8,767,307 B2 | 7/2014 | Nakamura |
| 8,830,298 B2 | 9/2014 | Abe et al. |
| 8,873,167 B2 | 10/2014 | Ning |
| 9,019,629 B2 | 4/2015 | Wang et al. |
| 9,091,843 B1 | 7/2015 | Hudyma et al. |
| 9,316,808 B1 | 4/2016 | Hudyma et al. |
| 9,316,820 B1 | 4/2016 | Hudyma et al. |
| 9,494,772 B1 | 11/2016 | Hudyma et al. |
| 9,726,859 B1 | 8/2017 | Hudyma et al. |
| 9,778,444 B1 | 10/2017 | Hudyma et al. |
| 9,784,943 B1 | 10/2017 | Hudyma et al. |
| 9,835,835 B1 | 12/2017 | Hudyma et al. |
| 9,995,910 B1 * | 6/2018 | Hudyma ............ G02B 13/0045 |
| 10,107,989 B1 | 10/2018 | Hudyma et al. |
| 10,139,595 B1 | 11/2018 | Hudyma et al. |
| 10,139,599 B1 | 11/2018 | Hudyma et al. |
| 2002/0034710 A1 | 3/2002 | Morris |
| 2003/0071929 A1 | 4/2003 | Moskovich |
| 2003/0086056 A1 | 5/2003 | Gupta |
| 2004/0095503 A1 | 5/2004 | Iwasawa |
| 2005/0067688 A1 | 3/2005 | Humpston |
| 2005/0082653 A1 | 4/2005 | McWilliams et al. |
| 2005/0082654 A1 | 4/2005 | Humpston et al. |
| 2005/0085016 A1 | 4/2005 | McWilliams et al. |
| 2005/0087861 A1 | 4/2005 | Burtzlaff et al. |
| 2005/0095835 A1 | 5/2005 | Humpston et al. |
| 2005/0117225 A1 | 6/2005 | Ebbesmeier |
| 2005/0275955 A1 | 12/2005 | Sekine |
| 2006/0050398 A1 | 3/2006 | Gurevich |
| 2006/0262416 A1 | 11/2006 | Lee et al. |
| 2007/0096295 A1 | 5/2007 | Burtzlaff et al. |
| 2007/0096311 A1 | 5/2007 | Humpston et al. |
| 2007/0096312 A1 | 5/2007 | Humpston et al. |
| 2007/0138644 A1 | 6/2007 | McWilliams et al. |
| 2007/0145564 A1 | 6/2007 | Honer |
| 2007/0190691 A1 | 8/2007 | Humpston et al. |
| 2007/0190747 A1 | 8/2007 | Humpston et al. |
| 2008/0029879 A1 | 2/2008 | Tuckerman et al. |
| 2008/0074761 A1 | 3/2008 | Yamakawa et al. |
| 2008/0099900 A1 | 5/2008 | Oganesian et al. |
| 2008/0099907 A1 | 5/2008 | Oganesian et al. |
| 2008/0106998 A1 | 5/2008 | Ito |
| 2008/0174887 A1 | 7/2008 | Asami |
| 2008/0296717 A1 | 12/2008 | Beroz et al. |
| 2009/0023249 A1 | 1/2009 | Honer et al. |
| 2009/0059393 A1 | 3/2009 | Obama |
| 2009/0086340 A1 | 4/2009 | Sato |
| 2009/0135499 A1 | 5/2009 | Hackemer |
| 2009/0161066 A1 | 6/2009 | Blum |
| 2009/0212381 A1 | 8/2009 | Crisp et al. |
| 2009/0219631 A1 | 9/2009 | Ning |
| 2009/0244724 A1 | 10/2009 | Shibata |
| 2009/0251801 A1 | 10/2009 | Jung et al. |
| 2009/0303608 A1 | 12/2009 | Schauss |
| 2010/0020420 A1 | 1/2010 | Heu |
| 2010/0033848 A1 | 2/2010 | Hatada |
| 2010/0053407 A1 | 3/2010 | Crisp et al. |
| 2010/0165478 A1 | 7/2010 | Ohno |
| 2010/0277816 A1 | 11/2010 | Kweon |
| 2011/0069160 A1 | 3/2011 | Ning |
| 2011/0216156 A1 | 9/2011 | Bigioi et al. |
| 2011/0216157 A1 | 9/2011 | Bigioi et al. |
| 2011/0255182 A1 | 10/2011 | Calvet et al. |
| 2011/0255856 A1 | 10/2011 | Reshidko |
| 2011/0274423 A1 | 11/2011 | Gutierrez |
| 2011/0316969 A1 | 12/2011 | Hsieh et al. |
| 2011/0317013 A1 | 12/2011 | Gutierrez et al. |
| 2012/0019613 A1 | 1/2012 | Murray et al. |
| 2012/0026285 A1 | 2/2012 | Yoshida et al. |
| 2012/0033228 A1 | 2/2012 | Tschudi et al. |
| 2012/0033300 A1 | 2/2012 | Nakahara |
| 2012/0063761 A1 | 3/2012 | Tang et al. |
| 2012/0120283 A1 | 5/2012 | Capata et al. |
| 2012/0121243 A1 | 5/2012 | Calvet et al. |
| 2012/0147485 A1 | 6/2012 | Kubota |
| 2012/0206618 A1 | 8/2012 | Albu et al. |
| 2012/0207347 A1 | 8/2012 | Albu et al. |
| 2012/0307165 A1 | 12/2012 | Wang |
| 2012/0307358 A1 | 12/2012 | Baum et al. |
| 2012/0321293 A1 | 12/2012 | Schauss et al. |
| 2012/0327292 A1 | 12/2012 | Wang |
| 2013/0070126 A1 | 3/2013 | Albu |
| 2013/0075237 A1 | 3/2013 | Gutierrez |
| 2013/0076919 A1 | 3/2013 | Gutierrez |
| 2013/0077945 A1 | 3/2013 | Liu et al. |
| 2013/0107108 A1 | 5/2013 | Schauss et al. |
| 2013/0107218 A1 | 5/2013 | Ebbesmeier et al. |
| 2013/0107376 A1 | 5/2013 | Tsai et al. |
| 2013/0120859 A1 | 5/2013 | Tsai et al. |
| 2013/0155399 A9 | 6/2013 | Hwang et al. |
| 2013/0188265 A1 | 7/2013 | Ebbesmeier et al. |
| 2013/0201392 A1 | 8/2013 | Gutierrez |
| 2013/0208353 A1 | 8/2013 | Huddleston |
| 2013/0242080 A1 | 9/2013 | Kossin |
| 2013/0258140 A1 | 10/2013 | Lipson et al. |
| 2013/0258490 A1 | 10/2013 | Ishihara |
| 2013/0270419 A1 | 10/2013 | Singh et al. |
| 2013/0329121 A1 | 12/2013 | Ono |
| 2013/0335831 A1 | 12/2013 | Ono |
| 2013/0335836 A1 | 12/2013 | Chung |
| 2014/0028887 A1 | 1/2014 | Azuma |
| 2014/0043525 A1 | 2/2014 | Azuma et al. |
| 2014/0071331 A1 | 3/2014 | Katou |
| 2014/0092271 A1 | 4/2014 | Katou |
| 2014/0125858 A1 | 5/2014 | Sugita |
| 2015/0062720 A1 | 3/2015 | Lai et al. |
| 2015/0125858 A1 | 5/2015 | Park et al. |
| 2015/0301310 A1 | 10/2015 | Chen |
| 2017/0059829 A1 | 3/2017 | Marks et al. |

FOREIGN PATENT DOCUMENTS

| | | |
|---|---|---|
| EP | 2519852 B1 | 4/2013 |
| GB | 2330919 A | 5/1999 |
| JP | 2009533710 A | 9/2009 |
| WO | 99/34246 A1 | 7/1999 |
| WO | 99/42902 A2 | 8/1999 |
| WO | 99/42902 A3 | 10/1999 |
| WO | 00/37991 A1 | 6/2000 |
| WO | 00/38017 A1 | 6/2000 |
| WO | 01/51979 A2 | 7/2001 |
| WO | 02/44786 A2 | 6/2002 |
| WO | 02/056114 A2 | 7/2002 |
| WO | 02/44786 A3 | 8/2002 |
| WO | 03/075049 A2 | 9/2003 |
| WO | 03/075096 A2 | 9/2003 |
| WO | 03/075096 A3 | 11/2003 |
| WO | 02/056114 A3 | 12/2003 |
| WO | 2004/010200 A1 | 1/2004 |
| WO | 03/075049 A3 | 4/2004 |
| WO | 2005/015283 A1 | 2/2005 |
| WO | 2005/040928 A1 | 5/2005 |
| WO | 2005/054949 A2 | 6/2005 |

(56) References Cited

FOREIGN PATENT DOCUMENTS

| | | | |
|---|---|---|---|
| WO | 2005/054949 | A3 | 12/2005 |
| WO | 2011/141280 | A1 | 11/2011 |

OTHER PUBLICATIONS

Yen, Hung-Ju and Liou, Guey-Sheng: "A facile approach towards optically isotropic, colorless, and thermoplastic polyimidothioethers with high refractive index." J. Mater. Chem., The Royal Society of Chemistry, 2010, vol. 20, Issue 20, pp. 4080-4084. DOI:10.1039/C000087F.

Naoaki Suzuki, Yasuo Tomita, Kentaroh Ohmori, Motohiko Hidaka and Katsumi Chikama, "Highly transparent ZrO2 nanoparticle-dispersed acrylate photopolymers for volume holographic recording," Optics Express, Optical Society of America, Dec. 25, 2006, vol. 14, Issue 26, pp. 12712-12719. DOI:10.1364/OE14.012712.

Akhmad Herman Yuwono, Binghai Liu, Junmin Xue, John Wang, Hendry Izaac Elim, Wei Ji, Ying Li and Timothy John White, "Controlling the crystallinity and nonlinear optical properties of transparent TiO2-PMMA nanohybrids". Journal of Materials Chemistry, The Royal Society of Chemistry, Aug. 20, 2004, vol. 14, Issue 20, pp. 2978-2987. DOI:10.1039%2Fb403530e.

Notice of Allowance, dated Apr. 18, 2018, for U.S. Appl. No. 14/932,593, filed Nov. 4, 2015.

Non-Final Rejection, dated Feb. 5, 2019, for U.S. Appl. No. 14/932,663, filed Nov. 4, 2015.

Final Rejection, dated May 24, 2018, for U.S. Appl. No. 14/932,717, filed Nov. 4, 2015.

Notice of Allowance, dated Oct. 2, 2018, for U.S. Appl. No. 14/932,717, filed Nov. 4, 2015.

Non-Final Rejection, dated May 15, 2018, for U.S. Appl. No. 15/340,960, filed Nov. 1, 2016.

Notice of Allowance, dated Jun. 12, 2018, for U.S. Appl. No. 15/340,960, filed Nov. 1, 2016.

Non-Final Rejection, dated Feb. 6, 2018, for U.S. Appl. No. 15/429,150, filed Feb. 9, 2017.

Final Rejection, dated Jun. 8, 2018, for U.S. Appl. No. 15/429,150, filed Feb. 9, 2017.

Notice of Allowance, dated Jul. 16, 2018, for U.S. Appl. No. 15/429,150, filed Feb. 9, 2017.

Non-Final Rejection, dated Dec. 13, 2017, for U.S. Appl. No. 14/932,663, filed Nov. 4, 2015.

Notice of Allowance, dated Aug. 9, 2018, for U.S. Appl. No. 14/932,663, filed Nov. 4, 2015.

Non-Final Rejection, dated Jan. 24, 2019, for U.S. Appl. No. 15/728,402, filed Oct. 9, 2017.

Notice of Allowance, dated Jan. 31, 2019, for U.S. Appl. No. 15/723,143, filed Oct. 2, 2017.

* cited by examiner

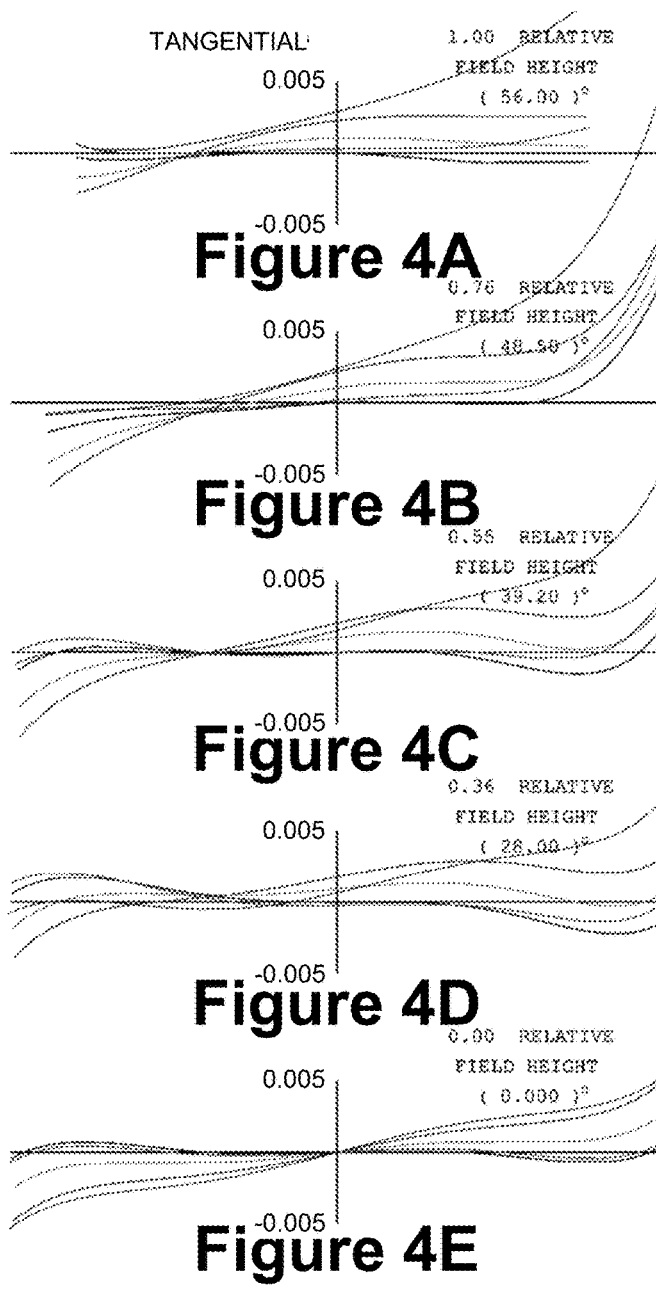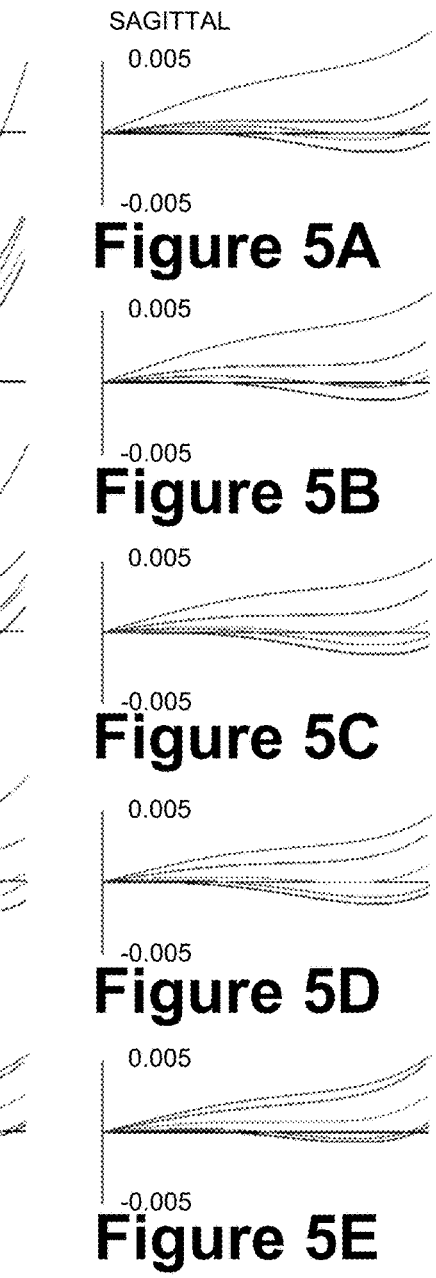
Figure 4A, Figure 4B, Figure 4C, Figure 4D, Figure 4E
Figure 5A, Figure 5B, Figure 5C, Figure 5D, Figure 5E
Prime Lens
(7.1mm, f/2.4, 120deg)
Ray Aberrations (Millimeters)

Falcon Objective
(7.1mm, f/2.4, 112d)
Ray Aberrations (Millimeters)

650.0000 NM
610.0000 NM
555.0000 NM
510.0000 NM

COMPACT WIDE FIELD OF VIEW DIGITAL CAMERA WITH STRAY LIGHT IMPACT SUPPRESSION

PRIORITY AND RELATED APPLICATIONS

This application claims priority to U.S. patent application Ser. No. 62/075,161, filed Nov. 4, 2014. This application is also a continuation-in-part (CIP) which claims priority to U.S. Ser. No. 14/810,377, filed Jul. 27, 2015, now U.S. Pat. No. 9,726,859, which is a CIP of U.S. Ser. No. 14/215,056, filed Mar. 16, 2014, now U.S. Pat. No. 9,091,843. This application is also related to U.S. Ser. No. 14/215,041, filed Mar. 16, 2014, now U.S. Pat. No. 9,494,772 and to U.S. Ser. No. 14/215,049, filed Mar. 16, 2014, now U.S. Pat. No. 9,316,820, and to U.S. Ser. No. 14/215,058, filed Mar. 16, 2014, now U.S. Pat. No. 9,316,808. This application is also one of a group of related, contemporaneously filed patent applications, entitled OPTICAL ASSEMBLY FOR A COMPACT WIDE FIELD OF VIEW DIGITAL CAMERA WITH HIGH MTF, Ser. No. 14/932,593; OPTICAL ASSEMBLY FOR A COMPACT WIDE FIELD OF VIEW DIGITAL CAMERA WITH LOW LATERAL CHROMATIC ABERRATION, Ser. No. 14/932,663; OPTICAL ASSEMBLY FOR A COMPACT WIDE FIELD OF VIEW DIGITAL CAMERA WITH LOW FIRST LENS DIAMETER TO IMAGE DIAGONAL RATIO, Ser. No. 14/932,717; and A COMPACT WIDE FIELD OF VIEW DIGITAL CAMERA WITH STRAY LIGHT IMPACT SUPPRESSION, Ser. No. 14/932,748. Each of these priority and related applications is incorporated by reference.

BACKGROUND

Point Action cameras, as they are referred to herein, go by many other names, including point of view cameras (see, e.g., pointofviewcameras.com), helmet cameras, action cams or action cameras, point of view shooter cams, video action cameras, and extreme sports cameras among others. Brand names include GoPro and ReplayXD. Conventional point action cameras typically have significant distortion, particularly at the outer several degrees of the field of view. In addition, astigmatism errors in conventional point action cameras can negatively impact the appearance of the video images that it captures. It is desired to have a point action camera or other compact digital camera that is capable of capturing a wide field of view, or a field of view that is greater than 90 degrees in either or both of the horizontal (x) and/or vertical (y) dimensions (or an arbitrary axis normal to the depth (z) dimension), and perhaps 135-150 degrees or more in the horizontal (x) dimension and/or perhaps 110-120 degrees or more in the vertical (y) dimension, and that is configured with built-in distortion and astigmatism correction.

Distortion in wide field of view cameras has been reduced with image processing software (see, e.g., U.S. Pat. Nos. 8,493,459 and 8,493,460, and US published patent applications nos. US20110216156 and US20110216157). It is desired however to alternatively provide a point action camera or other compact wide field of view digital camera, wherein the distortion that is typically inherent in wide field of view systems such as conventional point action cameras is compensated by an effective and efficient optical design.

Alex Ning describes a six lens design in U.S. Pat. No. 7,023,628 that has a ratio of total track length (TTL) to effective focal length (EFL), or TTL/EFL, that has a maximum value of 15 over which Ning states that the design would not have been considered compact. The Ning six lens design also has a minimum value of 8 under which Ning states that the design would not achieve the required fish eye field of view. U.S. Pat. No. 7,929,221 describes multiple optical assemblies that each include three aspheric surfaces on two lens elements and that each have a TTL/EFL ratio between 15 and 25. In an unrelated technical field, U.S. Pat. No. 7,675,694 nonetheless describes multiple optical assemblies that each include six aspheric surfaces on three lens elements. At U.S. Pat. No. 8,873,167, Ning describes an optical system that includes three lens elements in the first group and either having no aspheric lens elements or two aspheric lens elements, one in each of the two optical groups. In one example, Ning discloses a TTL/EPL ratio of 17.6, while in more compact examples TTL/EFL is described as being not less than 8.

It is also desired to have a compact camera design that captures reliably focused images. It is therefore desired to have an optical design that features a depth of focus that is greater than 20 microns.

It is recognized by the present inventors that it would be advantageous to have a design that is compact in having both a low TTL/EFL ratio and a low ratio of front element diameter to image diagonal and that achieves stable wide field of view image capture capability with tolerable, minimal, insubstantial, insignificant or drastically reduced distortion and astigmatism characteristics. Wang et al. have proposed at U.S. Pat. No. 9,019,629 an optical assembly for a mobile phone camera that exhibits a ratio of the sensor diagonal to the focal length between 1.27 and 1.55. The optical assembly of Wang et al. is not however configured for capturing images at a wide field of view.

It is also recognized by the present inventors that it would be advantageous to have a compact camera design that is carefully configured to suppress negative effects from stray light and achieve high dynamic range (HDR) imaging. It is therefore desired to have an optical design wherein near normal incidence surfaces are significantly avoided and at least 90% of return ghost foci are displaced at least 2 mm from the image sensor plane. In addition, it is desired to achieve a stray light irradiance ratio that is significantly below 1/1000, and even significantly below 1/10,000 in certain embodiments, and approximately at, or not greater than, or below 1/100,000 in certain embodiments, and a stray light power ratio that is significantly below 1/100 and approximately at, or not greater than, or below 1/1000 in certain embodiments.

As image sensor technology continues to improve, ever higher pixel densities are being achieved so that camera miniaturization need not imply low image quality in terms of resolution and contrast. It is therefore desired to have an optical assembly that has a high modulation transfer function or MTF at the Nyquist and half Nyquist frequencies. In this same context, it is desired to have an optical assembly capable of producing images without lateral chromatic aberrations larger than 2-3 pixels.

BRIEF DESCRIPTION OF THE DRAWINGS

FIGS. 4A-4E and 5A-5E respectively show plots of tangential and sagittal ray aberrations for the wide field of view objective assembly illustrated in FIG. 1A.

BRIEF DESCRIPTION OF THE TABLES

Figure 1A:
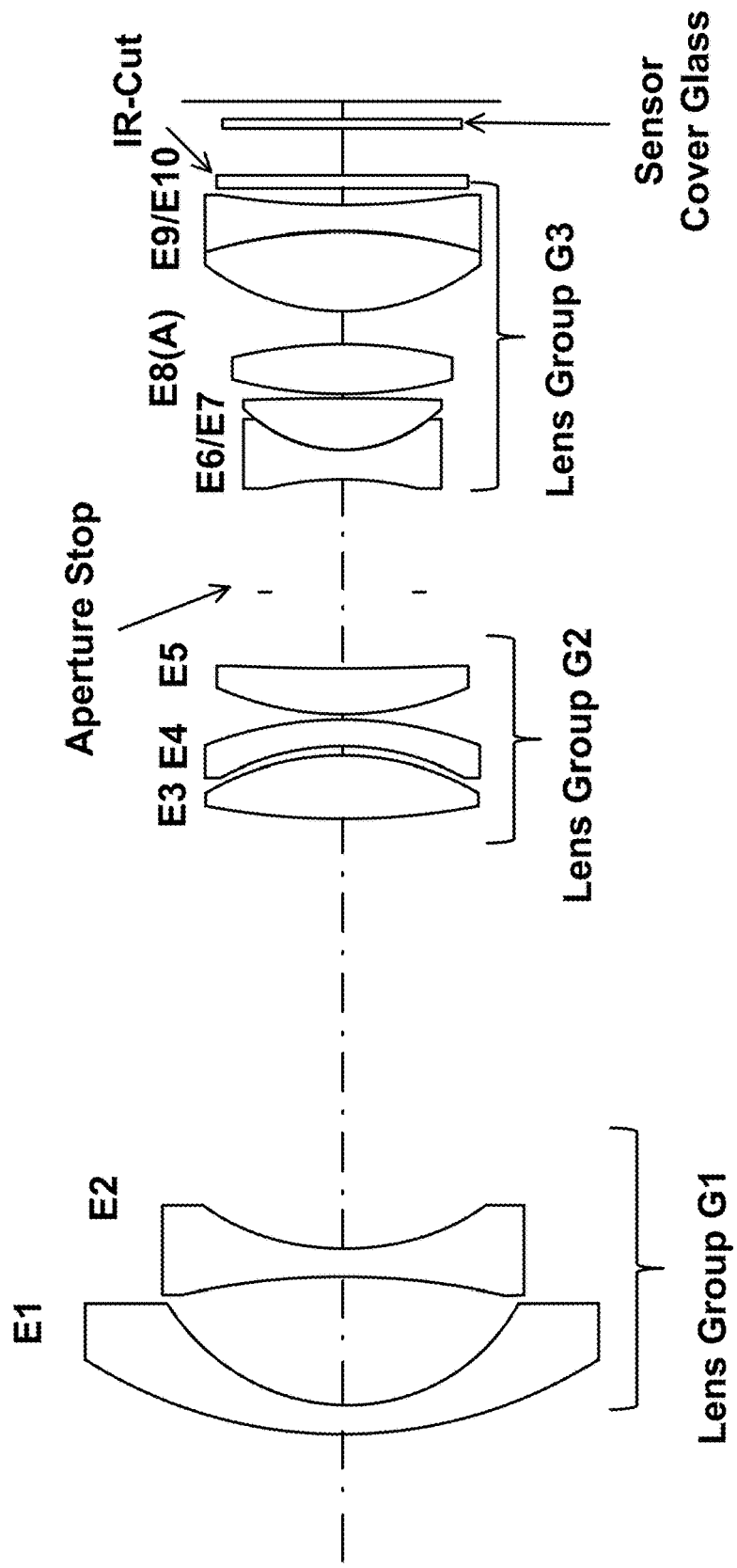
FIG. 1A schematically illustrates an optical assembly for a point action camera in accordance with certain embodiments.

Table 1 includes an Optical Design Prescription in accordance with a first example embodiment. It is here noted that the Glass code=xxxxxx.yyyyyy describes the refractive index (xxxxxx) and dispersion (yyyyyy) For example: 516800.641672 means that the refractive index $n_d$=1.5168 and the dispersion $v_d$=64.1672, each for the "d-line", where the "d-line"=587.5618 nm (yellow helium line).

Table 2 includes Aspheric Sag Data Relative to Best Fit Sphere (SAG <10 um) in accordance with the first example embodiment.

Table 3 includes quantitative data for a design of an aspheric element E8(A) that enables multiple order astigmatism correction in accordance with the first example embodiment.

Table 4 includes an Optical Design Prescription in accordance with a second example embodiment. It is here noted that the Glass code=xxxxxx.yyyyyy describes the refractive index (xxxxxx) and dispersion (yyyyyy) For example: 516800.641672 means that the refractive index $n_d$=1.5168 and the dispersion $v_d$=64.1672, each for the "d-line", where the "d-line"=587.5618 nm (yellow helium line).

Table 5 includes Aspheric Sag Data Relative to Best Fit Sphere (SAG <12 um) in accordance with the second example embodiment.

Table 6 includes quantitative data for a design of an aspheric element E7(A) that enables multiple order astigmatism correction in accordance with the second example embodiment.

TABLE 1

| RDY | THI | RMD | GLA |
|---|---|---|---|
| >OBJ: | INFINITY | 5000.000000 | |
| 1: | 32.32500 | 1.800000 | 882997.407651 |
| 2: | 13.40000 | 8.175409 | |
| 3: | −51.80000 | 1.800000 | 496999.815459 |
| 4: | 16.95000 | 27.500000 | |
| 5: | 53.50000 | 4.000000 | 496999.815459 |
| 6: | −18.60000 | 0.535248 | |
| 7: | −17.80000 | 1.800000 | 846660.237779 |
| 8: | −24.86000 | 0.250000 | |
| 9: | 20.40000 | 2.925000 | 882997.407651 |
| 10: | 119.00000 | 4.929804 | |
| STO: | INFINITY | 7.196775 | |
| 12: | −20.00000 | 1.800000 | 755199.275121 |
| 13: | 9.12500 | 3.400000 | 496999.815459 |
| 14: | −112.50000 | 0.250000 | |
| 15: | 31.93637 | 3.160000 | 496999.815459 |
| ASP: | | | |
| A: −.154815E−04 | | B: 0.319205E−06 | C: 0.110561E−07 |
| D: −.243906E−09 | | E: 0.289139E−11 | |
| 16: | −30.98000 | 2.159011 | |
| 17: | 15.35000 | 5.000000 | 618000.633335 |
| 18: | −31.72500 | 1.800000 | 523459.515405 |
| 19: | 55.00000 | 1.018753 | |
| 20: | INFINITY | 0.800000 | 516330.641420 |
| 21: | INFINITY | 3.000000 | |
| 22: | INFINITY | 0.540000 | 516330.641420 |
| 23: | INFINITY | 1.160000 | |
| 24: | INFINITY | 0.000000 | |

TABLE 1-continued

| RDY | THI | RMD | GLA |
|---|---|---|---|
| IMG: | INFINITY | 0.000000 | |

SPECIFICATION DATA

| | | | |
|---|---|---|---|
| FNO | 2.40000 | | |
| DIM | MM | | |
| WL | 650.00 | 610.00 | 555.00 |
| | 510.00 | 465.00 | |
| REF | 3 | | |
| WTW | 1   2 | 4 | 2 |
| | 1 | | |
| YAN | 0.00000  18.00000 | 30.00000 | 42.00000 |
| | 60.00000 | | |

TABLE 2

ASPHERIC EQUATION $$Z = \frac{(CURV)Y^2}{1 + (1 - (1+K)(CURV)^2 Y^2)^{1/2}} + (A)Y^4 + (B)Y^6 + (C)Y^8 + (D)Y^{10}$$

WHERE THE ASPHERIC COEFFICIENTS ARE AS FOLLOWS:
A: −1.548150E−05
B: 3.192050E−07
C: 1.105610E−08
D: −2.439060E−10
E: 2.891390E−12

| Y | ASPH SAG (Z) | SPHERE SAG | SAG DIFFERENCE |
|---|---|---|---|
| 0.000000 | 0.000000 | 0.000000 | −0.007892 |
| 0.250000 | 0.000978 | 0.000993 | −0.007878 |
| 0.500000 | 0.003913 | 0.003972 | −0.007834 |
| 0.750000 | 0.008803 | 0.008937 | −0.007758 |
| 1.000000 | 0.015645 | 0.015890 | −0.007647 |
| 1.250000 | 0.024436 | 0.024831 | −0.007497 |
| 1.500000 | 0.035171 | 0.035763 | −0.007300 |
| 1.750000 | 0.047848 | 0.048687 | −0.007052 |
| 2.000000 | 0.062461 | 0.063607 | −0.006747 |
| 2.250000 | 0.079009 | 0.080524 | −0.006377 |
| 2.500000 | 0.097489 | 0.099442 | −0.005939 |
| 2.750000 | 0.117903 | 0.120365 | −0.005430 |
| 3.000000 | 0.140256 | 0.143297 | −0.004851 |
| 3.250000 | 0.164557 | 0.168241 | −0.004207 |
| 3.500000 | 0.190822 | 0.195204 | −0.003510 |
| 3.750000 | 0.219075 | 0.224190 | −0.002777 |
| 4.000000 | 0.249350 | 0.255205 | −0.002037 |
| 4.250000 | 0.281691 | 0.288254 | −0.001329 |
| 4.500000 | 0.316156 | 0.323345 | −0.000704 |
| 4.750000 | 0.352823 | 0.360484 | −0.000231 |
| 5.000000 | 0.391786 | 0.399678 | 0.000000 |
| 5.250000 | 0.433169 | 0.440936 | −0.000125 |
| 5.500000 | 0.477127 | 0.484265 | −0.000754 |
| 5.750000 | 0.523860 | 0.529675 | −0.002077 |
| 6.000000 | 0.573629 | 0.577174 | −0.004346 |
| 6.250000 | 0.626773 | 0.626773 | −0.007892 |

TABLE 3

| Height (Y) | Aspheric Sag (um) | Height (Y) | Aspheric Slope (um/mm) |
|---|---|---|---|
| 0.000 | −7.892 | 0.000 | 0.000 |
| 0.250 | −7.878 | 0.250 | 0.056 |
| 0.500 | −7.834 | 0.500 | 0.176 |
| 0.750 | −7.758 | 0.750 | 0.304 |
| 1.000 | −7.647 | 1.000 | 0.444 |
| 1.250 | −7.497 | 1.250 | 0.600 |
| 1.500 | −7.300 | 1.500 | 0.788 |
| 1.750 | −7.052 | 1.750 | 0.992 |
| 2.000 | −6.747 | 2.000 | 1.220 |
| 2.250 | −6.377 | 2.250 | 1.480 |
| 2.500 | −5.939 | 2.500 | 1.752 |
| 2.750 | −5.430 | 2.750 | 2.036 |
| 3.000 | −4.851 | 3.000 | 2.316 |
| 3.250 | −4.207 | 3.250 | 2.576 |
| 3.500 | −3.510 | 3.500 | 2.788 |
| 3.750 | −2.777 | 3.750 | 2.932 |
| 4.000 | −2.037 | 4.000 | 2.960 |
| 4.250 | −1.329 | 4.250 | 2.832 |
| 4.500 | −0.704 | 4.500 | 2.500 |
| 4.750 | −0.231 | 4.750 | 1.892 |
| 5.000 | 0.000 | 5.000 | 0.924 |
| 5.250 | −0.125 | 5.250 | −0.500 |
| 5.500 | −0.754 | 5.500 | −2.516 |
| 5.750 | −2.077 | 5.750 | −5.292 |
| 6.000 | −4.346 | 6.000 | −9.076 |
| 6.250 | −7.892 | 6.250 | −14.184 |

TABLE 4

| RDY | THI | RMD | GLA |
|---|---|---|---|
| > OBJ: | INFINITY | 5000.000000 | |
| 1: | 21.17500 | 2.750000 | 882997.407651 |
| 2: | 7.60000 | 5.105000 | |
| 3: | −37.00000 | 1.400000 | 496999.815459 |
| 4: | 11.50000 | 2.413000 | |
| 5: | −54.60000 | 1.400000 | 496999.815459 |
| 6: | 14.85000 | 3.400000 | 737999.322613 |
| 7: | −37.42500 | 2.920000 | |
| 8: | 12.70000 | 1.400000 | 808095.227608 |
| 9: | 9.00000 | 3.175000 | 618000.633335 |
| 10: | −24.70000 | 2.017500 | |
| STO: | INFINITY | 3.067000 | |
| 12: | −21.93390 | 2.000000 | 496999.815459 |
| ASP: | | | |
| A:−.242148E−03 | B: −.719194E−06 | C:−.953571E−07 | |
| D:0.000000E+00 | | | |
| 13: | −24.75000 | 0.720000 | |
| 14: | −16.72500 | 1.400000 | 761821.265179 |
| 15: | 17.50000 | 3.925000 | 618000.633335 |
| 16: | −14.62500 | 1.095000 | |
| 17: | 22.70000 | 2.815000 | 618000.633335 |
| 18: | 113.27500 | 0.700000 | |
| 19: | 15.81000 | 3.480000 | 618000.633335 |
| 20: | 56.70000 | 2.560134 | |
| 21: | INFINITY | 0.840000 | 516330.641420 |
| 22: | INFINITY | 4.721276 | |
| 23: | INFINITY | 0.540000 | 516330.641420 |
| 24: | INFINITY | 1.160000 | |
| 25: | INFINITY | 0.000000 | |
| IMG: | INFINITY | 0.000000 | |

SPECIFICATION DATA

| | | | |
|---|---|---|---|
| FNO | 2.40000 | | |
| DIM | MM | | |
| WL | 650.00 | 610.00 | 555.00 |
| | 510.00 | 465.00 | |
| REF | 3 | | |
| WTW | 1   2 | 4 | 2 |
| | 1 | | |
| YAN | 0.00000  30.00000 | 42.00000 | 60.00000 |

TABLE 5

ASPHERIC EQUATION $$Z = \frac{(CURV)Y^2}{1 + (1 - (1+K)(CURV)^2 Y^2)^{1/2}} + (A)Y^4 + (B)Y^6 + (C)Y^8 + (D)Y^{10}$$

WHERE THE ASPHERIC COEFFICIENTS ARE AS FOLLOWS:
A: −0.242148E−03
B: −0.719194E−06
C: −0.953571E−07

TABLE 5-continued

CURVATURE OF BEST SPHERE = −0.051948
RADIUS OF BEST SPHERE = −19.250

| Y | ASPH SAG (Z) | SPHERE SAG | SAG DIFFERENCE |
|---|---|---|---|
| 0.000000 | 0.000000 | 0.000000 | 0.000000 |
| 0.140000 | −0.000447 | −0.000509 | −0.000062 |
| 0.280000 | −0.001789 | −0.002036 | −0.000248 |
| 0.420000 | −0.004029 | −0.004582 | −0.000553 |
| 0.560000 | −0.007174 | −0.008147 | −0.000973 |
| 0.700000 | −0.011231 | −0.012731 | −0.001500 |
| 0.840000 | −0.016211 | −0.018336 | −0.002125 |
| 0.980000 | −0.022128 | −0.024962 | −0.002834 |
| 1.120000 | −0.028996 | −0.032609 | −0.003613 |
| 1.260000 | −0.036834 | −0.041281 | −0.004446 |
| 1.400000 | −0.045662 | −0.050977 | −0.005314 |
| 1.540000 | −0.055504 | −0.061699 | −0.006195 |
| 1.680000 | −0.066385 | −0.073449 | −0.007065 |
| 1.820000 | −0.078334 | −0.086229 | −0.007896 |
| 1.960000 | −0.091383 | −0.100042 | −0.008659 |
| 2.100000 | −0.105568 | −0.114888 | −0.009320 |
| 2.240000 | −0.120927 | −0.130771 | −0.009844 |
| 2.380000 | −0.137505 | −0.147694 | −0.010189 |
| 2.520000 | −0.155348 | −0.165658 | −0.010310 |
| 2.660000 | −0.174508 | −0.184667 | −0.010160 |
| 2.800000 | −0.195043 | −0.204725 | −0.009681 |
| 2.940000 | −0.217019 | −0.225833 | −0.008815 |
| 3.080000 | −0.240504 | −0.247997 | −0.007493 |
| 3.220000 | −0.265578 | −0.271219 | −0.005641 |
| 3.360000 | −0.292330 | −0.295504 | −0.003174 |
| 3.500000 | −0.320855 | −0.320855 | 0.000000 |

TABLE 6

| Height (Y) | Aspheric Sag (um) | Height (Y) | Aspheric Slope (um/mm) |
|---|---|---|---|
| 0.000 | 0.000 | 0.000 | 0.000 |
| 0.140 | −0.062 | 0.140 | −0.443 |
| 0.280 | −0.248 | 0.280 | −1.329 |
| 0.420 | −0.553 | 0.420 | −2.179 |
| 0.560 | −0.973 | 0.560 | −3.000 |
| 0.700 | −1.500 | 0.700 | −3.764 |
| 0.840 | −2.125 | 0.840 | −4.464 |
| 0.980 | −2.834 | 0.980 | −5.064 |
| 1.120 | −3.613 | 1.120 | −5.564 |
| 1.260 | −4.446 | 1.260 | −5.950 |
| 1.400 | −5.314 | 1.400 | −6.200 |
| 1.540 | −6.195 | 1.540 | −6.293 |
| 1.680 | −7.065 | 1.680 | −6.214 |
| 1.820 | −7.896 | 1.820 | −5.936 |
| 1.960 | −8.659 | 1.960 | −5.450 |
| 2.100 | −9.320 | 2.100 | −4.721 |
| 2.240 | −9.844 | 2.240 | −3.743 |
| 2.380 | −10.189 | 2.380 | −2.464 |
| 2.520 | −10.310 | 2.520 | −0.864 |
| 2.660 | −10.160 | 2.660 | 1.071 |
| 2.800 | −9.681 | 2.800 | 3.421 |
| 2.940 | −8.815 | 2.940 | 6.186 |
| 3.080 | −7.493 | 3.080 | 9.443 |
| 3.220 | −5.641 | 3.220 | 13.229 |
| 3.360 | −3.174 | 3.360 | 17.621 |
| 3.500 | 0.000 | 3.500 | 22.671 |

DETAILED DESCRIPTIONS OF THE EMBODIMENTS

A compact wide field of view digital camera and an optical assembly for a compact wide field of view digital camera are provided herein. The optical assembly includes at least two optical groups that are separated by an aperture stop. The first optical group is configured to collective light at a wide field of view. The optical layout is designed to provide low distortion and low aberrational error. An aspheric lens element is provided to reduce astigmatism.

The embodiments described in detail herein provide several advantageous features. In certain embodiments, the optical assembly is designed to provide a high dynamic range (HDR) & high resolution (HR) imagery. Four thousand (4K) pixels or more are resolvable across the horizontal field of view of the optical assembly in accordance with certain embodiments. An optical assembly in accordance with certain embodiments exhibits a high MTF at the Nyquist frequency (~200 lp/mm) and/or a high MTF thru focus at ½ Nyquist (~100 lp/mm). The optical assembly covers a wider field of view than contemporary objectives, e.g., 120 degrees or more. In certain embodiments, a number of resolvable spots within a sensor active area is enhanced in accordance with a larger space bandwidth project, and lateral chromatic aberration (LCA) is less than two pixels or less than 5 microns and color fringing is avoided.

An optical assembly in accordance with certain embodiments exhibits low field curvature and suppresses the impact of stray light. An optical assembly in accordance with certain embodiments exhibits a low ratio of front element diameter relative to image diagonal even though images are captured at a wide field of view with low distortion and low astigmatism characteristics. In certain embodiments, an IR cut filter is integrated into a housing for the optical assembly. In certain embodiments, the optical assembly includes three or four optical groups, and a telecentric cone is delivered to an image sensor plane.

An optical assembly in accordance with certain embodiments is designed to avoid causing stray light to impact image quality. As such, two surface ghosts or double bounce ghosts from lens surfaces, ghosting originating from sensor and subsequent reflections from lens surfaces back to the image sensor, and scattered light from mechanical structures and edges of lens elements are suppressed in the design of the optical assembly. Stray light contributions are avoided in the optical design process by reducing the number and location of near normal incidence surface for both marginal and chief rays, wherein the angle of incidence or refraction of these rays is ~0 degrees. Since any pair of surfaces can generate a ghost image in a design with n surfaces, there are n(n−1)/2 potential ghost images that are formed. The key to developing a design with exceptional stray light rejection properties is the management of where these secondary ghost images come to focus. To accomplish this, a "keep out" zone is defined wherein ghost images must form more than +/−2 mm from the sensor plane. In certain embodiments, more than 90% of return ghost foci are disposed outside of this +/−2 mm keep out zone. In certain embodiments, more than 90% of return ghosts foci are disposed more than +/−2 mm from sensor.

An optical assembly is provided for a point action camera having a wide field of view in excess of 120 degrees. The optical assembly has multiple lens elements including at least one lens element that has an aspheric lens surface. The optical assembly exhibits a modulation transfer function (hereinafter "MTF") at Nyquist frequency that is above 0.3 and a MTF at half Nyquist frequency that is above 0.5 across the wide field of view. In certain embodiments, the MTF at Nyquist frequency is above 0.35 and the MTF at half Nyquist frequency is above 0.55.

Another optical assembly is provided for a point action camera having a wide field of view in excess of 120 degrees. The optical assembly has multiple lens elements including one or more aspheric lens surfaces. The optical assembly exhibits less than five microns of lateral chromatic aberration. In certain embodiments or in combination with certain images sensors, the optical assembly has less than two pixels of lateral chromatic aberration.

Another optical assembly is provided for a point action camera having a wide field of view in excess of 120 degrees. The optical assembly has multiple lens elements including one or more aspheric lens surfaces. A ratio of a diameter of a first lens element at the object end of the optical assembly to an image diagonal is less than approximately 3. In certain embodiments, the first lens element has a convexo-concave or meniscus shape and a diameter less than 30 mm, and in some embodiments less than 25 mm, and in some embodiments is not more than 23 mm.

Another optical assembly is provided for a point action camera having a wide field of view in excess of 120 degrees. The optical assembly has multiple lens elements including one or more aspheric lens surfaces. The optical assembly is configured such that 90% or more of return ghost foci are displaced from the image sensor plane by at least +/−2 mm. In certain embodiments, an irradiance ratio is less than 1/10,000 and a stray light power ratio is less than 1/100. In addition, in certain embodiments, an advantageously low stray light irradiance ratio is achieved that is significantly below 1/1000, and even significantly below 1/10,000 in certain embodiments, and approximately at, or not greater than, or below 1/100,000 in certain embodiments. Also, an advantageously low stray light power ratio is achieved in certain embodiments that is significantly below 1/100 and approximately at, or not greater than, or below 1/1000 in certain embodiments.

In certain embodiments, a ratio of total track length to effective focal length, or TTL/EFL, is less than 12, and in some embodiments, TTL/EFL is less than 8. The total track length is less than 10 cm in some embodiments.

From object end to image end, an optical assembly in accordance with certain example embodiments includes first, second and third optical groups. The first optical group may include two or more lens elements configured to collect and reduce a field angle of light incident at a wide field of view in excess of 120 degrees. The second optical group may include one or two or more lens elements. The third optical group may include two or more lens elements, wherein at least one lens element of the third optical group may include an aspheric surface that is configured to correct higher order astigmatism. An aperture stop may be disposed between the second and third optical groups. In certain embodiments, the third optical group includes an IR cut filter. In certain embodiments, the second and/or third optical groups may have three lens elements or more.

In certain embodiments, the third optical group may include one or more doublets. The third optical group may include a first doublet and a second doublet. An aspheric lens element may be disposed between the first and second doublets.

The first optical group may include a convexo-concave or meniscus lens. A diameter of the convexo-concave or meniscus lens of the first optical group may be less than 30 mm, and in certain embodiments less than 25 mm. A ratio of the diameter of the convexo-concave or meniscus lens of the first optical group to an image size may be less than 3 in certain embodiments. The first optical group may also include a biconcave lens.

The second optical group may include, from object end to image end, a biconvex or quasi-planar-convex or planar-convex lens, a concavo-convex or meniscus lens, and a convexo-planar or convexo-quasi-planar or biconvex lens.

The third optical group may include, from object end to image end, a first doublet, an aspheric lens element and a second doublet. The first doublet may include a biconcave or quasi-planar-concave lens having an image facing surface attached to an object facing surface of a convexo-planar or convexo-quasi-planar lens. The second doublet may include a biconvex lens having an image facing side attached to an object facing side of a biconcave lens or concavo-quasi-planar lens. An IR cut filter may be included within the third optical group after the second doublet.

The optical assembly may include a fourth optical group that is configured to deliver a telecentric cone to the image sensor. The fourth optical group may include a convexo-planar, convexo-quasi-planar or convexo-concave lens element. The fourth optical group may further include a second convexo-planar, convexo-quasi planar or convexo-concave lens element.

The aspheric surface may have an aspheric sag that is less than approximately 10 microns in certain embodiments. The aspheric sag slope of the aspheric surface may be less than approximately 15 microns per millimeter in certain embodiments.

An optical assembly in accordance with certain embodiments includes a single aspheric lens element. That is, the single aspheric lens element may be the only aspheric lens element within the optical assembly. In accordance with these embodiments, lens elements other than the single aspheric lens element may have spherical or planar lens surfaces, or both, each without significant aspheric departure.

An optical assembly in accordance with certain embodiments may include a single aspheric lens surface. That is, only one surface of a single aspheric lens element in an optical assembly in accordance with these embodiments has an aspheric departure. In accordance with these embodiments, lens element surfaces other than the single aspheric lens surface may have spherical or planar shapes, or both, without significant aspheric departure.

In certain embodiments, the optical assembly includes only one aspheric lens element.

In certain embodiments, the optical assembly includes only one aspheric lens surface.

A digital point action camera or other compact wide field of view digital camera is also provided that includes an optical assembly in accordance with any of the embodiments described herein, as well as an image sensor disposed approximately at a focal plane of the optical assembly. A digital camera housing may include electronics and a user interface, and may be configured to contain the optical assembly and the image sensor in optically effective relative disposition.

Another optical assembly is provided for a point action camera or other wide field of view digital camera having a wide field of view including multiple lens elements and having at least one aspheric surface. The optical assembly is configured to provide a wide field of view, which is in certain embodiments in excess of 120 degrees. The optical assembly includes an inward field curvature of less than approximately 75 microns. In certain embodiments, the inward field curvature is less than approximately 60 microns. In other embodiments, the inward field curvature is less than approximately 50 microns.

Another optical assembly is provided for a point action camera having a wide field of view, including multiple lens elements, and having at least one aspheric surface. This optical assembly is configured to provide a field of view in excess of 120 degrees and exhibits no more than 0.7 mm of longitudinal astigmatism.

Another optical assembly is provided for a point action camera having a wide field of view, including multiple lens elements, and having at least one aspheric surface. This optical assembly is configured to provide a field of view in excess of 120 degrees and exhibits a ratio of total track length to effective focal length that is less than 8.

Another optical assembly is provided for a point action camera having a wide field of view in excess of 150 degrees, including multiple lens elements, and having at least one aspheric surface with no more than 30 microns of aspheric sag and no more than 25 microns/millimeter of aspheric sag slope.

In certain embodiments, the longitudinal astigmatism comprises approximately 0.6 mm or less, or in other embodiments, approximately 0.5 mm or less, or approximately 0.3 mm or less, or approximately 0.2 mm or less, or approximately 0.1 mm or less in certain embodiments.

From object end to image end, an optical assembly in accordance with certain embodiments includes a first optical group and a second optical group, wherein the first optical group is configured to collect light at a wide field of view and a second optical group is configured to correct distortion or astigmatism error or both. An aperture stop may be disposed between said first and second optical groups. Alternatively, the optical assembly may include a third optical group and the aperture stop may be disposed between the second and third optical groups. The optical assembly may also include a fourth optical group.

The first optical group may include two or more convexo-concave or meniscus lenses. The first optical group may include a biconvex lens.

The second and/or third optical group may be configured to correct astigmatism error. The second or third optical group may include multiple lens elements including a lens element that is configured with an aspheric departure to correct astigmatism error. In certain embodiments, the ultimate or penultimate lens element of the optical lens assembly includes an aspheric departure, while an aspheric lens element may be provided adjacent just after the aperture stop. In certain embodiments, an object facing surface of this lens element has an aspheric departure. The optical assembly may include seven or eight or more lens elements, including one or more doublets.

A second, third or fourth optical group (from object to image) may include three or four lens elements. The second optical group may include, from object side to image side, a first singlet, a doublet and a second singlet. The first singlet may include a biconvex or plano-convex or quasi-plano-convex lens. The second singlet may include a biconvex, or convexo-plano or convexo-quasi-plano lens. The doublet may include in certain embodiments, from object side to image side, a biconcave lens and a biconvex lens.

A third optical group may be disposed after the second optical group or between the first and second optical groups. The third optical group may include one or two doublets. The third optical group may include an aspheric lens element. The aspheric lens element may be disposed between the aperture stop and a doublet, or between a pair of doublets.

The optical assembly may include a fourth optical group that is disposed after the third optical group and configured to deliver a telecentric cone to the image sensor. The fourth optical group may include a convexo-planar, convexo-quasi-planar or convexo-concave lens element. The fourth optical group may further include a second convexo-planar, convexo-quasi planar or convexo-concave lens element.

The lateral chromatic aberration (LCA) of an optical assembly in accordance with certain embodiments may be less than approximately three pixels. The LCA in certain embodiments may be less than approximately two pixels. The LCA in certain embodiments may be less than approximately five microns or less than approximately three microns.

An optical assembly in accordance with certain embodiments may include a single aspheric lens element, which may be the only aspheric lens element within the optical assembly. In these embodiments, lens elements other than the single aspheric lens element have spherical or planar lens surfaces, or both, each without significant aspheric departures.

An optical assembly in accordance with certain embodiments may include a single aspheric lens surface, which may be the only aspheric lens surface within the optical assembly. In these embodiments, lens surfaces other than the single aspheric lens surface have spherical or planar lens surfaces, or both, each without significant aspheric departures.

Another optical assembly in accordance with certain embodiments includes only one aspheric lens element. Subsets of these embodiments include lens elements that have two aspheric surfaces, i.e., both the object facing surface and the image facing surface of a same aspheric lens element are configured with aspheric departure. Other subsets of these embodiments include lens elements that have only a single aspheric lens surface, i.e., either the object facing surface or the image facing surface is aspheric, while the other surface does not have significant aspheric departure or to tolerance one of the lens surfaces is spherical.

Another optical assembly in accordance with certain embodiments includes only one aspheric lens surface. This optical assembly includes a single aspheric lens surface configured to correct astigmatism.

A digital point action camera is provided that includes any of the optical assemblies described herein, along with an image sensor disposed approximately at a focal plane of the optical assembly. A digital camera housing includes electronics and a user interface, and contains and durably affixes the optical assembly and the image sensor in optically effective relative disposition. The housing may be waterproof and may include shock absorbing material to withstand shocks such as may be caused by collisions or sudden acceleration or high speed or high frequency jitter.

An aspheric lens element is provided for an optical assembly of a wide field of view point action camera in accordance with any of the embodiments of optical assemblies or point action cameras described herein. In certain embodiments, one or both surfaces has an approximately 30 microns or less sag and an approximately 25 microns/millimeter or less aspheric sag slope. In a specific embodiment, only a single lens surface has aspheric departure. In another embodiment, both the image facing surface and the object facing surface of the same lens element include aspheric departures.

In addition, combinations of features described herein, above and/or below, with regard to different embodiments form additional embodiments of optical assemblies, point action cameras and aspheric lens elements. Features of embodiments of optical assemblies that include two lens groups may be combined with those that include three lens groups. For example, the first and second lens groups G1 and G2, of an optical assembly that includes three lens groups, G1, G2 and G3, may be thought of as an optical assembly having a first lens group G1'=G1+G2 and a second lens group G2'=G3, or alternatively G1'=G1 and G2'=G2+G3.

Several example embodiments are described below and are illustrated in the accompanying drawings. In certain embodiments, a seventh lens element, from object to image, is the only lens element of the optical assembly that includes one or two aspheric surfaces. In the example of FIG. 1A, the E6/E7 doublet may be considered to be a single lens element, the sixth lens element of the optical assembly illustrated schematically in FIG. 1A, such that the singlet E8(A) can be considered to be the seventh lens element in that optical assembly.

In certain embodiments, the object facing surface of the seventh lens element, or the thirteenth or fifteenth surface of the optical assembly, has an aspheric departure. The image facing surface of the seventh lens element, or the fourteenth or sixteenth lens surface of the optical assembly, may have an aspheric surface also, or may alternatively have a spherical surface that may be slightly curved or quasi-planar, or may have a significant spherical curvature, or may be approximately planar.

Alternatively, the fourteenth and/or sixteenth lens surfaces may be the only surface or surfaces of the optical assembly that has an aspheric departure, while the thirteenth and/or fifteenth surfaces may have a planar, quasi-planar or convex spherical curvature. The single lens element of the optical assembly that has aspheric departure in certain embodiments may be the fifth or sixth or eighth lens element rather than the seventh, or may be instead the first or the second lens element. In these alternative embodiments, one or both surfaces of the single aspheric lens element may have aspheric departure, and in those embodiments wherein only a single lens surface has aspheric departure, the other surface of the aspheric lens element may be planar, or may be quasi-planar or slightly spherically curved, or may be significantly spherical.

Example Embodiments

Figure 1B:
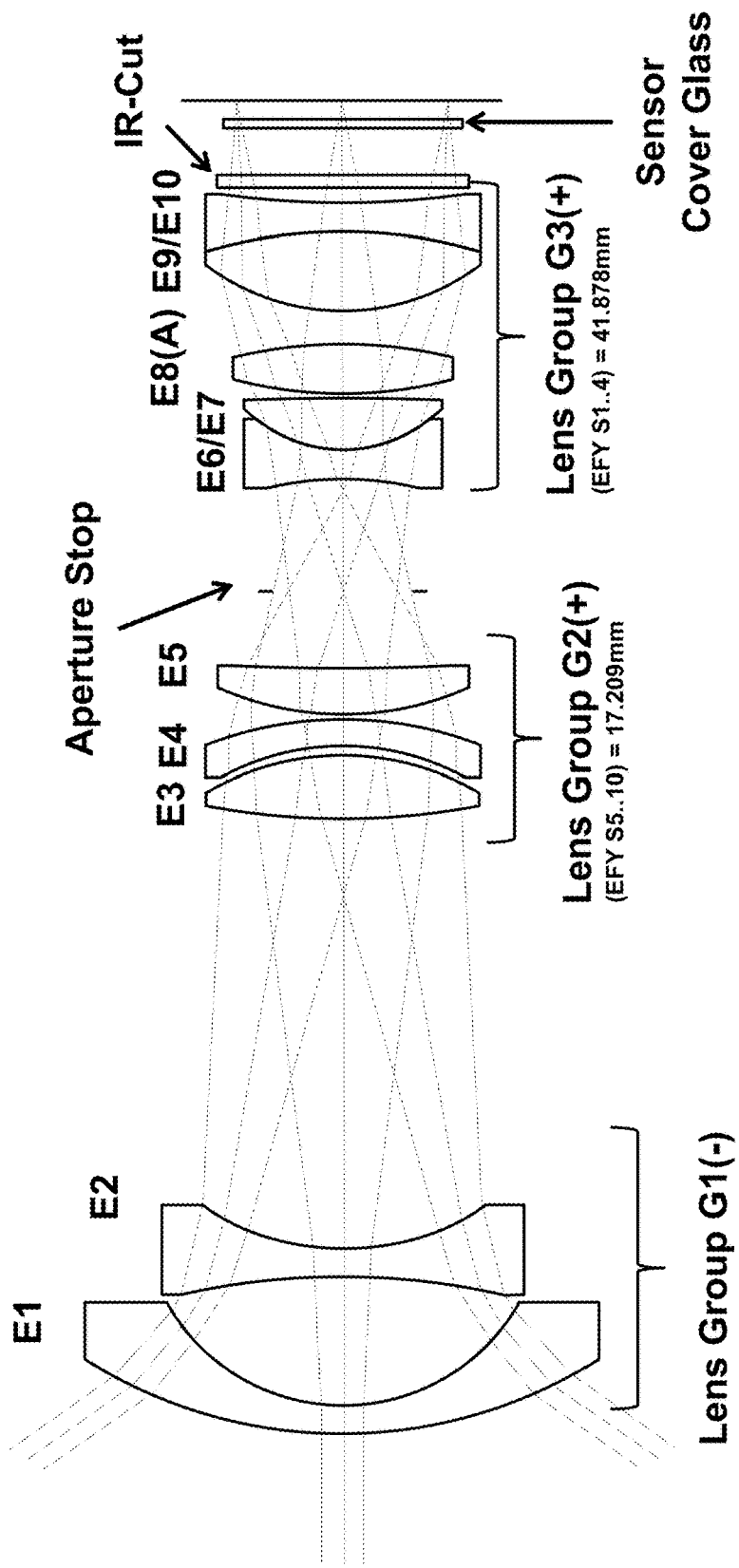
FIG. 1B is a ray trace diagram for the optical assembly illustrated schematically in FIG. 1A.

Referring to the example illustrated schematically in FIGS. 1A-1B, and in the plots shown in FIGS. 2-8, and quantitatively at Tables 1-3, an optical assembly in accordance with certain embodiments may include a first lens group G1, a second lens group G2 and a third lens group G3. The first lens group G1 is disposed nearer to the object or scene that is being imaged than the second lens group G2. The second lens group G2 is disposed between the first lens group G1 and the third lens group G3. The image plane lies just beyond the third lens group G3. Together, the first, second and third optical groups G1, G2 and G3, respectively, cover a wide field of view, i.e., greater than 120 degrees, or in certain embodiment greater than 135 degrees and in others greater than 150 degrees and even in certain embodiments significantly close to 180 degrees. Alternatively, there may be two, or four or more lens groups instead of three, or the entire optical assembly may form a single lens group.

Generally speaking, the lens group G1 is configured to collect wide field rays and reduce the field angle to groups G2 and G3. The group G2 is configured to provide advantageously low axial chromatic aberration and spherochromatism or variation of spherical with wavelength. For example, in certain embodiments the axial chromatic aberration, as may be defined by the ray trace at the 0.7 zonal in the pupil, is less than 0.025 microns across the spectral band, e.g., from 465 nm to 650 nm. The arrangement of G2 and G3 about the aperture stop advantageously balances field aberrations of multiple orders. The placement and configuration of the asphere E8(A) advantageously corrects higher order astigmatism.

The lens groups G2 and G3 are configured such that the optical assembly produces advantageously low imaging errors from aberrations, and particularly distortion and astigmatism. However, the configuration can include contributions within the second lens group G2 to the collection and reduction of wide field rays and/or contributions within the first lens group G1 to the correction of aberrations such as distortion and astigmatism. For example, one or more lens elements of the group G2 may have a material or shape characteristic tending to facilitate collection of wide angle rays and/or a surface of a lens element of group G1 may have aspheric departure configured to assist in the correction of aberrations.

In the embodiment illustrated schematically at FIGS. 1A-1B, the first lens group G1 includes two lenses from furthest to closest to the image plane, namely lens E1, and lens E2. Lens E1 comprises a convexo-concave lens, or meniscus, in the example embodiment of FIGS. 1A-1B. This means that the object facing surface of lens E1, which is the first surface of the optical assembly of the example embodiment of FIGS. 1A-1B, has a convex shape tending to converge incident light, while the image facing surface of lens E1, which is the second surface of the optical assembly of FIGS. 1A-1B, has a concave shape tending to diverge incident light. The lens E1 has a nominal overall optical power. This lens E1 may have an extended radius outside of an active radius which assists and facilitates a wide field of view feature of the optical assembly of FIGS. 1A-1B. The physical dimensional characteristics of the lenses of the optical assemblies of the embodiments described herein generally permit configuring the wide field of view optical assembly within a lens barrel of a point action camera and/or within a compact or miniature point action camera.

The lens E1 may be fixed, i.e., relative to the image plane and other fixed elements of the system. Alternatively, the lens E1 may be movable to permit focusing by automatic or manual actuation using, e.g., a voice coil motor, piezo, or MEMS coupled to the lens E1. In this alternative embodiment, a feedback based on analysis of image data received at the image sensor by a processor, an image processor or an image signal processor (ISP). Another optical group may include one or more movable lenses, mirrors or other optics. For example, in certain embodiments the lens E1 is fixed and one or more or all of the other lenses are movable, and in certain embodiments the entire optical assembly in movable relative to the image sensor. In this context, a zoom feature may also be provided optically and/or electronically. Thus, embodiments of point action cameras described herein include fixed focus, autofocus and autofocus zoom point action cameras. In certain embodiments, the lens E1 has an index of refraction at the sodium d line (i.e., 587.5618 nm) at around 1.88, or $n(\lambda_d) \approx 1.9$. The dispersion may be around 41. The lens E1 has little overall optical power, as mentioned, and serves primarily as a collecting lens that facilitates the wide field of view of the optical assembly.

Lens E1 has a larger diameter in order to collect rays at outer edges of the wide field of view and reduces the field angle for the subsequent lenses of the optical assembly. Lens group G1, and particularly lenses E1 and E2, generally serves to reduce the ray angle for the group G2 and G3 lens elements. Lens groups G2 and G3 generally serve to balance or correct field aberrations of multiple orders, including distortion and astigmatism errors. The overall optical design of the lens groups G2 and G3 generally serves to correct distortion, while the aspheric fifteenth surface of the optical assembly of FIGS. 1A-1B generally serves to correct higher order astigmatism.

The lens element E2 of the lens group G1 has a biconcave or plano-concave or quasi-plano-concave structure in the example of FIGS. 1A-1B. In other words the object facing surface of the lens E2, which is the third surface of the optical assembly of FIGS. 1A-1B, has a slightly or nominally concave or planar surface shape, while the image facing surface of the lens E2, or the fourth surface of the optical assembly of FIGS. 1A-1B, has a concave shape tending to diverge incident light rays. The lens E2 has a negative overall focal length and serves as a diverging optical element. In certain embodiments, the lens E2 has an index of refraction at the sodium d line (i.e., 587.5618 nm) at around 1.5, or $n(\lambda_d) \approx 1.5$. The dispersion may be around 82.

The lens group G1 has an overall negative focal length, e.g., in one embodiment EFL (G1)$\approx$−11.3 mm, and serves to collect and converge incoming light from an object, group of objects or a foreground, background or overall scene, including a wide field of view greater than 90 degrees in the horizontal and/or vertical dimensions, and typically 120, 135, or 150 degrees or more in the horizontal and/or 110-120 degrees or more in the vertical. The rays received from the optical group G1 are further optically reduced by optical group G2, which has a positive focal length, e.g., in one embodiment EFL (G2)$\approx$17.2 mm. Optical group G2 serves to correct aberrations such as distortion before images are captured by an image sensor of a point action camera for viewing on a display, and/or for recording or storage or for data analysis, monitoring, security or surveillance and/or for transmission and/or image processing.

The optical group G2 in the example of FIGS. 1A-1B includes three lens elements E3, E4 and E5, while the lens group G3 in the example of FIGS. 1A-1B includes the rest of the lenses of the optical assembly E6-E10.

The lens element E3 comprises a functionally converging optical element and has a biconvex structure in the illustrative example of FIGS. 1A-1B. Both the object facing and image facing surfaces of the lens element E3, which are the fifth and sixth surfaces of the optical assembly that is illustrated schematically in the example embodiment of FIGS. 1A-1B, are convex and tend to converge incident light. In certain embodiments, the lens element E3 has a strongest positive optical power among the elements of group G2. In certain embodiments, the lens E3 has an index of refraction at the sodium d line (i.e., 587.5618 nm) at around 1.5, or $n(\lambda d) \approx 1.5$. The dispersion may be around 82. In certain embodiments, the lens elements E2 and E3 are formed from a same or similar material.

Lens E4 may have a concavo-convex or meniscus shape. That is, the object facing surface of lens E4, which is the seventh surface of the optical assembly of FIG. 1A, has a concave shape tending to diverge incident light, while the image facing surface of the lens E4, which is the eighth surface of the optical assembly of FIG. 1A, has a convex shape tending to converge incident light. The lens E4 is disposed in the example of FIGS. 1A-1B just after lens E3. The shapes of the sixth and seventh surfaces may be similar in certain embodiments such that only a small gap exists between the lenses E3 and E4 substantially along their radii from center to edge. The lens E4 has nominal overall optical power. In certain embodiments, the lens E4 has an index of refraction at the sodium d line (i.e., 587.5618 nm) at around 1.85, or $n(\lambda_d) \approx 1.85$. The dispersion may be around 24.

The lens E5 has a convexo-planar or convexo-quasi-planar shape. The ninth and tenth surfaces of the optical assembly of FIG. 1A respectively exhibit convex and planar or quasi-planar shapes. Thus, the lens E5 tends to converge incident light rays before the aperture stop.

The lens group G2 may include one or two lenses, or four or more lenses, instead of the three lenses E3-E5 shown in the example of FIG. 1A.

An aperture stop is disposed between the lens element E5 and the lens element E6 in the example of FIG. 1A. Alternatively, an aperture stop is disposed between the lens groups G1 and G2, whatever number of optical elements each may comprise. An aperture stop may be located differently and there may be one or more additional apertures within the optical assembly.

The lenses E6 and E7 of the lens group G3 are coupled together to form a doublet. In certain embodiments, the image facing surface of lens E6 and the object facing surface of the lens E7 are in direct contact. An adhesive or other standard process of coupling constituent lenses of a doublet may be used, which process may depend upon the materials of the constituent lenses E6 and E7. In certain embodiments, the lens E6 has an index of refraction at the sodium d line (i.e., 587.5618 nm) at around 1.75, or $n(\lambda_d) \approx 1.75$. The dispersion of lens E6 may be around 28. In certain embodiments, the lens E7 has $n(\lambda_d) \approx 1.5$. In certain embodiments, the lens E7 has a dispersion around 82. In certain embodiments, the lens E7 may be formed from a same or similar material as lenses E2 and E3. The doublet overall serves to configure the light rays before becoming incident upon the lens element E8(A).

Referring to FIGS. 1A-1B, there a significant advantage to having an optical assembly in accordance with certain embodiments, wherein the E6/E7 doublet, which is shown disposed between the fifth singlet E5 and the asphere E8(A) in FIGS. 1A-1B, is configured to correct oblique aberrations.

The lens element E8(A) has a biconvex shape. The object facing surface of the lens E8(A), which is the fifteenth surface of the optical assembly of FIGS. 1A-1B, has a convex shape which relatively strongly converges incident light. The fifteenth surface of the optical assembly of FIGS. 1A-1B also has a significant aspheric departure in this example embodiment. The image facing surface of the lens E8(A), which is the sixteenth surface of the optical assembly of FIGS. 1A-1B, also has a convex shape. In certain embodiments, the lens E8(A) has an index of refraction at the sodium d line (i.e., 587.5618 nm) at around 1.5, or $n(\lambda_d) \approx 1.5$. The dispersion of the lens E8(A) may be around 82. The lens E8(A) may be formed from same or similar material as lenses E2, E3 and E7.

A second doublet E9/E10 is disposed after the E8(A) singlet. In certain embodiments, the image facing surface of lens E9 and the object facing surface of the lens E10 are in direct contact. An adhesive or other standard process of coupling constituent lenses of a doublet may be used, which process may depend upon the materials of the constituent lenses E9 and E10. In certain embodiments, the lens E9 has an index of refraction at the sodium d line (i.e., 587.5618 nm) at around 1.62, or $n(\lambda d) \approx 1.62$. The dispersion of lens E9 may be around 63. In certain embodiments, the lens E10 has $n(\lambda d) \approx 1.5$. In certain embodiments, the lens E10 has a dispersion around 52. The second doublet in the example of FIGS. 1A-1B overall serves to configure the light rays before becoming incident upon the image sensor.

Between the twentieth surface of the optical assembly of FIGS. 1A-1B and the image plane are an IR filter and a cover plate. The IR filter serves to cut out infrared light that can otherwise interfere with the function of a silicon-based image sensor to collect visible image data. In certain embodiments, the IR filter is disposed within a same housing as the optical assembly or the groups G2 and G3 if the group G1 is separately packaged or the group G3 if groups G1 and G2 are separately packaged. The cover plate serves to protect the image sensor from incident dust, water, oxygen or other corrosive or artifact producing elements that may be present in the ambient space surrounding the point action camera. A separate baffle may be included to reduce the amount of stray light that may become otherwise incident upon the image sensor. Each of the IR filter and the cover glass may have a refractive index around 1.5 and a dispersion around 64. For example, NBK7 Schott glass may be used.

The aspheric departure of the fifteenth optical surface of the optical assembly in the example embodiment of FIGS. 1A-1B serves to advantageously significantly reduce higher order astigmatism errors that would be otherwise inherent in a wide field of view system without an aspheric surface in accordance with embodiments described herein. Moreover, the advantageous design of the optical assembly of FIGS. 1A-1B, and specifically of the second and third optical groups G2 and G3, and more specifically of the aspheric lens element E8(A), and still more specifically of the aspheric object facing surface of the lens element E8(A) permits the optical assembly in this embodiment to have a more efficient manufacturability than conventional designs that contain multiple aspheric surfaces and/or multiple aspheric lenses or other optical elements.

The example embodiment of FIGS. 1A-1B has $H(\theta)/f*\theta=1.078$. In another similar embodiment $H(\theta)/f*\theta=1.174$. In other embodiments, $H(\theta)/f*\theta$ is greater than 1.2, 1.3, 1.4 and even 1.5, and in other embodiments $H(\theta)/f*\theta$ is approximately 1.

Table 1 generally discloses certain specifications of the example optical assembly that is represented schematically in side view in FIG. 1A. Table 1 lists RDY, which is the radius of curvature of the optical surface. Table 1 lists THI which are the thicknesses of the lenses E1-E10 and the spaces between the lenses E1-E10 in sequential order. The row 1 thickness describes the thickness of the first lens E1 in this embodiment. The row 2 thickness describes the thickness of the spacing between the first lens E1 and second lens E2. The spacing may include air, or for example dry air or nitrogen gas or vacuum or a noble gas, or a liquid such as water. The row 3 describes the thickness of the second lens E2. The row 4 describes the air spacing between the second lens E2 and the third lens E3 in this example. The row 5 describes the thickness of the third lens E3. The row 6 describes the thickness of the spacing between the third lens E3 and the fourth lens E4. The row 7 describes the thickness of the fourth lens E4 in this example. The row 8 describes the thickness of the spacing between the fourth lens E4 and the fifth lens E5. The row 9 describes the thickness of the fifth lens E5. The row 10 describes the thickness of the spacing between the fifth lens E5 and the aperture stop. The row STO describes the thickness of the air spacing between the aperture stop and the sixth lens E6. The row 12 describes the thickness of the sixth lens E6. The row 13 describes the thickness of the seventh lens E7. There is no spacing between the lenses E6 and E7 in this example wherein the lens element E6/E7 is a doublet. The row 14 describes the spacing between the E6/E7 doublet and the eighth lens E8(A). The row 15 describes the thickness of the eighth lens E8(A). The aspheric coefficients A-E for the eighth lens E8(A) are provided just below the row 15. The aspheric equation is provided at the top of Table 2. The row 16 describes the thickness of the spacing between lens E8(A) and lens E9. The row 17 describes the thickness of the lens E10. There is no spacing between the lens E9 and the lens E10 in this example wherein the lens element E9/E10 is a doublet. The row 19 describes the thickness between the E9/E10 doublet and the IR cut filter. The row 20 describes the thickness of the IR cut filter. The row 21 describes the spacing between the IR cut filter and the sensor cover glass. The row 22 describes the thickness of the sensor cover glass. The row 23 describes the thickness of the spacing between the sensor cover glass and the image plane.

Eight lens elements including six singlets and two doublets, or ten lenses E1-E10 make up the example optical assembly that is illustrated schematically at FIG. 1A, while a point action camera includes the IR cut filter, cover glass and an image sensor packaged within a housing along with the optical assembly. The first two lens elements E1-E2 form a first optical group G1, the next three lens elements E3-E5 form the second optical group G2, and the final three lens elements including five lenses E6-E10 form the third optical group G3.

The radii of curvature are, in the single aspheric surface example, approximately, i.e., within manufacturing tolerances, the same everywhere along the optical surface for each of the first through fourteenth and sixteenth through twentieth surfaces of the optical assembly of FIG. 1A. In Table 1, the row 12 describes the curvature of both the twelfth and thirteenth surfaces, which are the image facing surface of the lens E6 and the object facing surface of the lens E7, which have the same curvature. Likewise, the row 17 in Table 1 describes the curvature of both the eighteenth and nineteenth surfaces, which are the image facing surface of the lens E9 and the object facing surface of the lens E10, which have the same curvature. That is, the coefficients A thru E are each approximately zero for 19 out of 20 surfaces of the embodiment of FIG. 1A in the single aspheric surface example of a wide field of view optical assembly for a point action camera or compact camera, or miniature camera module or other camera or camera module including a single aspheric lens element, or only one aspheric lens element, and exhibiting advantageously low distortion and low astigmatism, as well as high MTF at Nyquist and half Nyquist frequencies, and low lateral chromatic aberration, and compactness in three spatial dimensions. The departures from spherical of the fifteenth surface are represented in Table 1 as nonzero coefficients A-E, which correspond mathematically to the coefficients indicated in the formula that is provided above the Table 2 in the illustration.

This formula with the non-zero coefficients A-E as indicated in Table 1 represent the aspheric curvature of the surface 15 or object facing surface of the lens E8(A) of the example optical assembly that is illustrated schematically in FIG. 1A.

The specification data of Table 1 represent the first order software inputs to complete the optical model. FNO is F number and is approximately 2.4 in this example. DIM is the dimension which is mm. WL are the wavelengths which are in nanometers, and are 650 nm (red), 610 nm (orange), 555 nm (yellow), 510 nm (green) and 465 nm (blue) in this example.

Table 2 shows aspherical and spherical SAG data for the fifteenth surface of the optical assembly of FIG. 1A. These data may fit to a formula for SAG for a spherical conic section, e.g., $z(r)=r^2/[R+(R^2-r^2)^{1/2}]$, wherein for a best sphere of radius 31.9 mm, as in an example embodiment, and a curvature of best sphere, R, corresponding to 0.03, the different actual radii of curvature, r, for a surface with aspheric departure produce SAG differences compared to values for a true spherical conic section. These aspherical SAGs for an example fifteenth surface are compared with would be true spherical SAGs in Table 2 for different distances Y from the vertex center at Y=0 to Y=6.25 (mm) in steps of 0.25 (mm).

Figure 2:
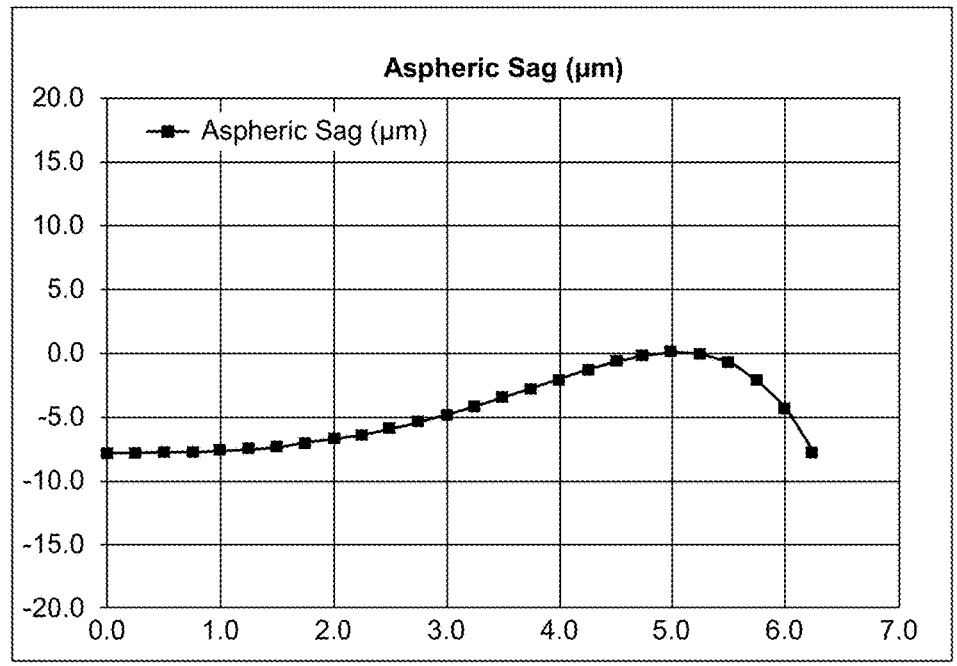
FIG. 2 is a plot of aspheric sag versus radial distance from the center of the asphere for the fifteenth surface from the object, or the object side surface of the seventh lens element E8(A), in the example optical assembly illustrated schematically in FIG. 1A.

The aspheric sags in Table 3 that are plotted in FIG. 2 are the aspheric sag difference numbers shown in Table 2, which are the differences from the best fit sphere sags of the aspheric surface 15 or object facing surface of the lens E8(A) in the example of FIG. 1A. Table 3 also shows values of aspheric slope that are plotted in FIG. 3.

Referring now to FIGS. 1A-8, FIG. 1A is described in detail above. FIG. 1B schematically illustrates a ray trace diagram for the optical assembly of FIG. 1A.

FIG. 2 is a plot of aspheric sag versus radial distance, or the data provided in the second column from the left in Table 3, for the $15^{th}$ optical surface from the object in the example optical assembly illustrated schematically in FIG. 1A. The aspheric sag for the $15^{th}$ surface in this example has a sag maximum between 4 mm and 6 mm from the center of the $15^{th}$ lens surface. The sag has minimum values between approximately −5 μm and −10 μm both at the center and at the edge about 6.25 mm from the center. The sag plot has a width of approximately 2 mm at −4 μm. The sag has points of inflection at approximately 4 mm and 6 mm from the center of the $15^{th}$ lens surface.

Figure 3:
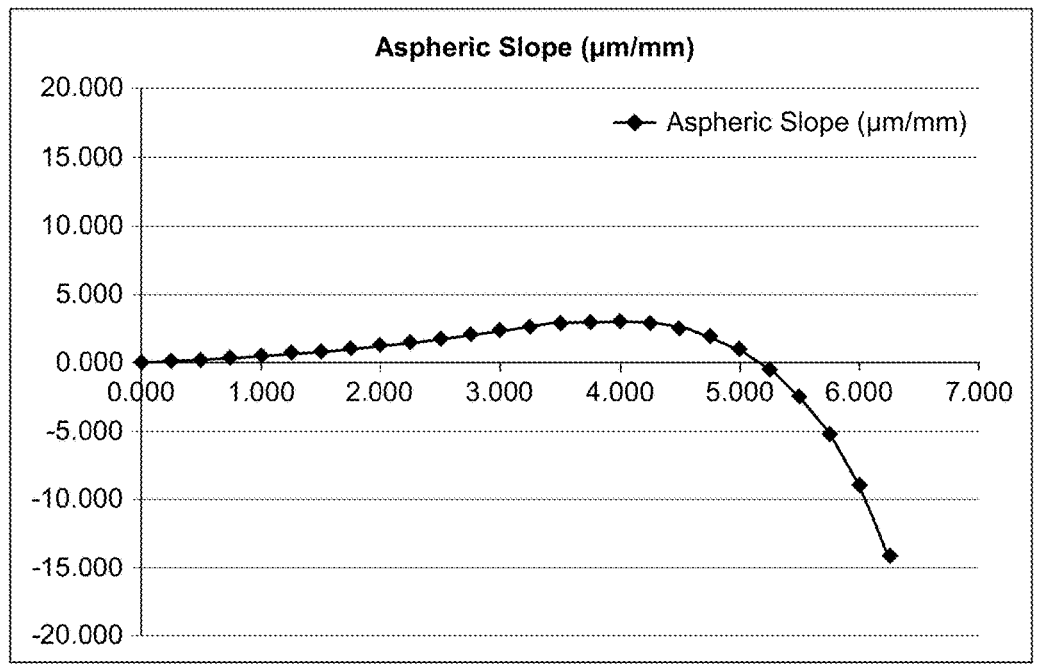
FIG. 3 is a plot of slope of aspheric sag versus radial distance from the center of the asphere for the fifteenth surface from the object, or the object side surface of the seventh lens element E8(A), in the example optical assembly illustrated schematically in FIG. 1A.

FIG. 3 is a plot of slope of aspheric sag versus radial distance, or the data provided in the fourth column from the left (or rightmost column) in Table 3, for the $15^{th}$ optical surface in the example optical assembly illustrated schematically in FIG. 1A. The aspheric slope has a maximum between o and 5 μm/mm between 3 mm and 5 mm from the center of the $15^{th}$ lens surface. The aspheric slope has a lowest value at the outer edge of the $15^{th}$ lens surface of around −15 μm/mm. The aspheric slope has points of inflection between around 3 mm and 4 mm and at the edge around 6 mm from the center of the $15^{th}$ lens surface.

While the asphere may be disposed on other optical surfaces and/or on other lens elements in other embodiments, the 15th surface is selected in the embodiment illustrated by example in FIG. 1A at least in part due to the advantageous ratio of the chief ray and marginal ray heights at that location within the optical assembly.

An image sensor, e.g., a charge coupled device (CCD) or a complementary metal oxide semiconductor (CMOS) device is disposed at the image plane in embodiments that include an assembled compact, miniature, point action or point of view camera or other compact digital camera. The optical assembly may be configured for later assembly with an image sensor. In this sense, the first and second optical groups may be manufactured or assembled separately and later combined, and in general, parts of the optical assembly or point action camera may be separately manufactured or assembled and it is possible in certain embodiments to replace, restore or realign optical group G1, optical group G2, optical group G3 and/or certain other groups of one or more of the lenses or other optical components of the optical assembly or point action camera.

FIGS. 4A-4E respectively show plots of tangential ray aberrations respectively at 75°, 55°, 35°, 15° and 0° for the wide field of view objective assembly illustrated in FIG. 1A. FIGS. 4A-4E and 5A-5E show five pairs of graphs, where each pair illustrates the tangential and sagittal rays at one of these five field angles. The independent variable (horizontal axis) is the relative coordinate of a ray over the pupil diameter. The vertical axis has a maximum distance measure of +/−approximately five microns or a spread of ten microns or less over a 150 degree field (which is clearly advantageous over a conventional system that may have, e.g., a 20 micron spread). The vertical axis therefore represents the transverse ray aberration (ray interception distance from the ideal focal point) of a ray passing through a specific relative pupil position. Graphs 4A-4E (tangential plane) and 5A-5E (sagittal plane) show the transverse ray aberrations for an on-axis ray bundle as the bundle is refracted through the lens elements of the optical assembly of FIG. 1A.

In FIGS. 4E and 5E, the performance of the embodiment of FIG. 1A is illustrated for a ray bundle at zero degrees with the optical axis. Graphs 4D and 5D show the performance of the optical assembly of FIGS. 1A-1B for a ray bundle when the light source is moved providing an incident angle of 28 degrees with the optical axis. Graphs 4C and 5C show the performance of the optical assembly of FIGS. 1A-1B for a ray bundle when the light source is moved providing an incident angle of 39.2 degrees with the optical axis. Graphs 4B and 5B show the performance of the optical assembly of FIGS. 1A-1B for a ray bundle when the light source is moved providing an incident angle of 48.5 degrees with the optical axis. Graphs 4A and 5A show the performance of the optical assembly of FIGS. 1A-1B for a ray bundle when the light source is moved providing an incident angle of 56 degrees with the optical axis.

LCA is demonstrated in FIGS. 4A-4E as the separation of the rays which correspond to five different colors or wavelengths, which are in this example 650 nm, 610 nm, 555 nm, 510 nm and 465 nm.

Figure 6:
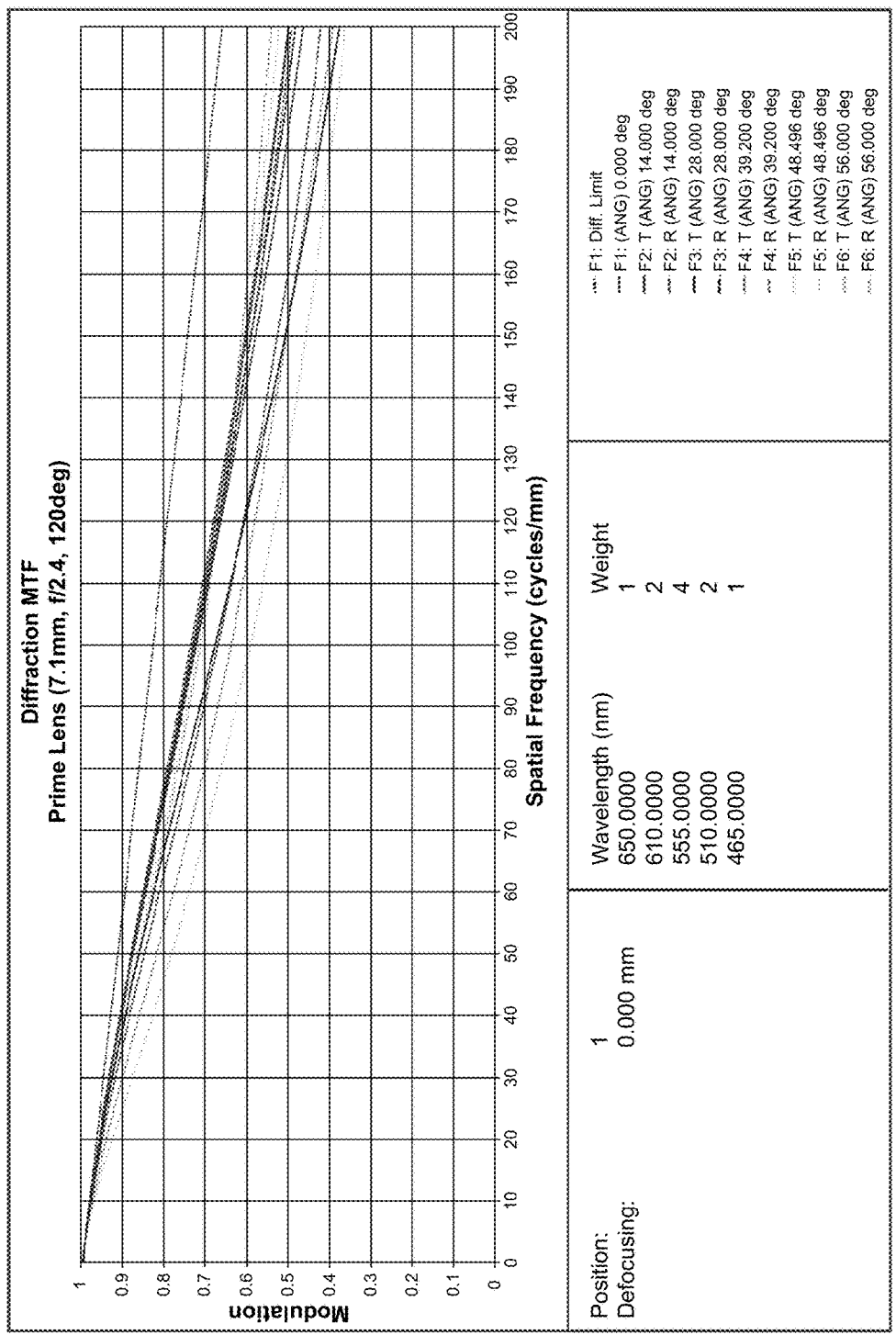
FIG. 6 illustrates diffraction modulation transfer function (MTF) plots of contrast vs. spatial frequency for tangential and sagittal rays impinging upon the optical assembly of FIG. 1A normal to the optical axis (F1), 15 degrees from normal to the optical axis (F2), 35 degrees from normal to the optical axis (F3), 55 degrees from normal to the optical axis (F4), and 75 degrees from normal to the optical axis (F5).

FIG. 6 illustrates the polychromatic diffraction modulation transfer function (MTF) plots of contrast vs. spatial frequency for pixels lying normal to the optical axis (F1), 14 degrees from normal to the optical axis (F2), 28 degrees from normal to the optical axis (F3), 39.2 degrees from normal to the optical axis (F4), 48.5 degrees from normal to the optical axis (F5), and 56 degrees from normal to the optical axis (F6). Those pixels lying at 56 degrees from normal to the optical axis would be those near the edge of an image captured with a point action camera assembly having a field of view of 120 degrees.

A point action camera or other compact digital camera is provided herein having a wide field of view of more than 90 degrees, and may be 120 degrees or more. Advantageously high areas under the curves are noticeable in FIG. 6. In accordance with FIGS. 4A-4E, the plots of FIG. 6 demonstrate that the image quality of the embodiment of FIG. 1A is advantageous. For example, all of the plots are above 0.3, and in fact above 0.35, at 200 cycles/mm and all of the plots are above 0.5, and in fact above 0.55, at 100 cycles/mm. This indicates that the optical assembly of FIG. 1A is configured to provide images of objects with exceptional contrast so that in tandem with an image sensor having pixels that are no larger than a few microns, e.g., 2.4 microns, high quality images can be captured.

Figure 7:
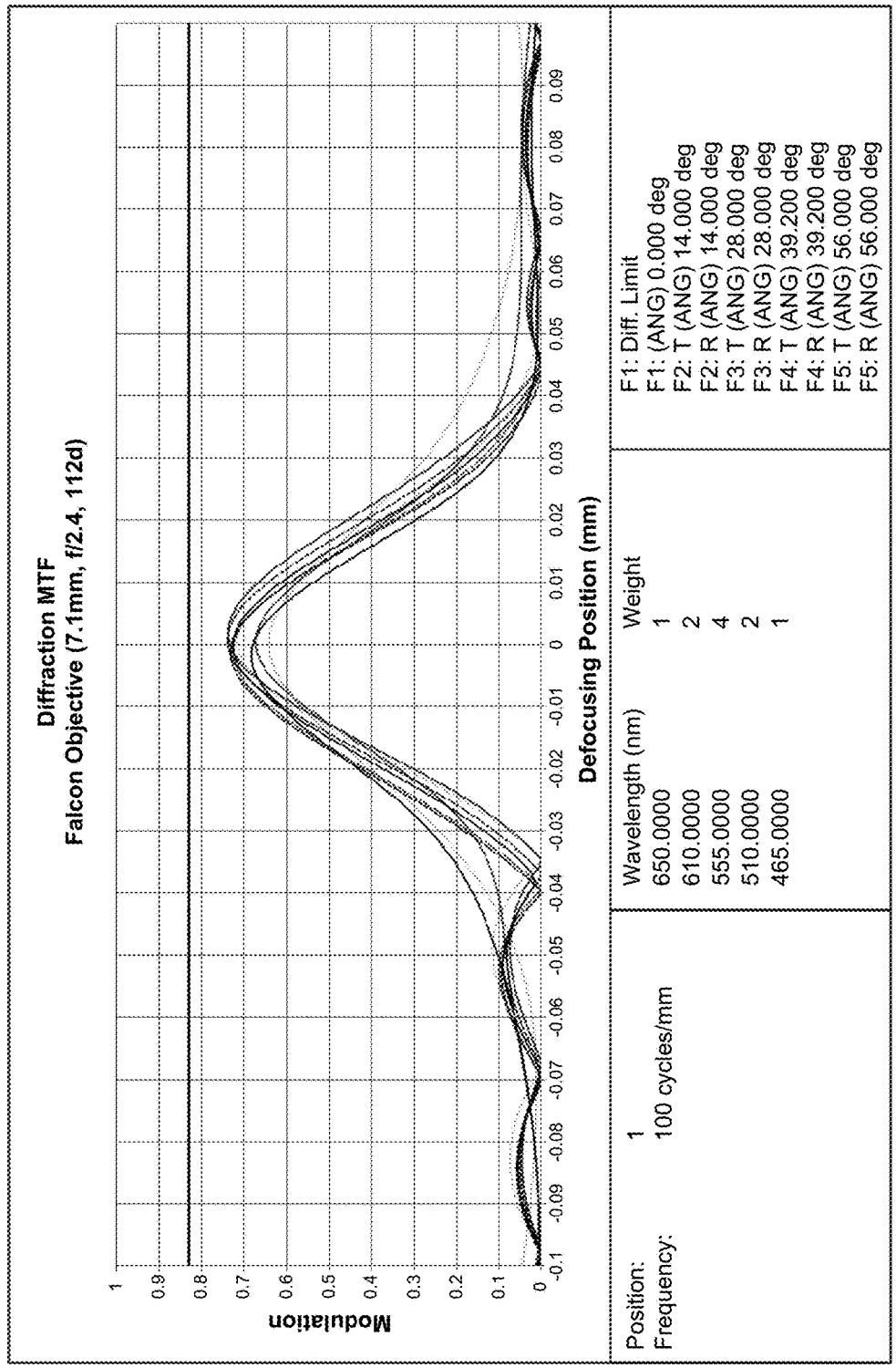
FIG. 7 illustrates diffraction modulation transfer function (MTF) plots of modulation vs. defocussing position for tangential and sagittal rays impinging upon the optical assembly of FIG. 1A normal to the optical axis (F1), 14 degrees from normal to the optical axis (F2), 28 degrees from normal to the optical axis (F3), 39.2 degrees from normal to the optical axis (F4), and 56 degrees from normal to the optical axis (F5).

FIG. 7 shows plots of diffraction modulation transfer function (MTF) versus defocussing position for rays incident at 0, 14, 28, 39 and 56 degrees. The plots of FIG. 7 show that an advantageous depth of focus is provided by the optical assembly of FIGS. 1A-1B that is not less than 20 microns.

Figure 8:
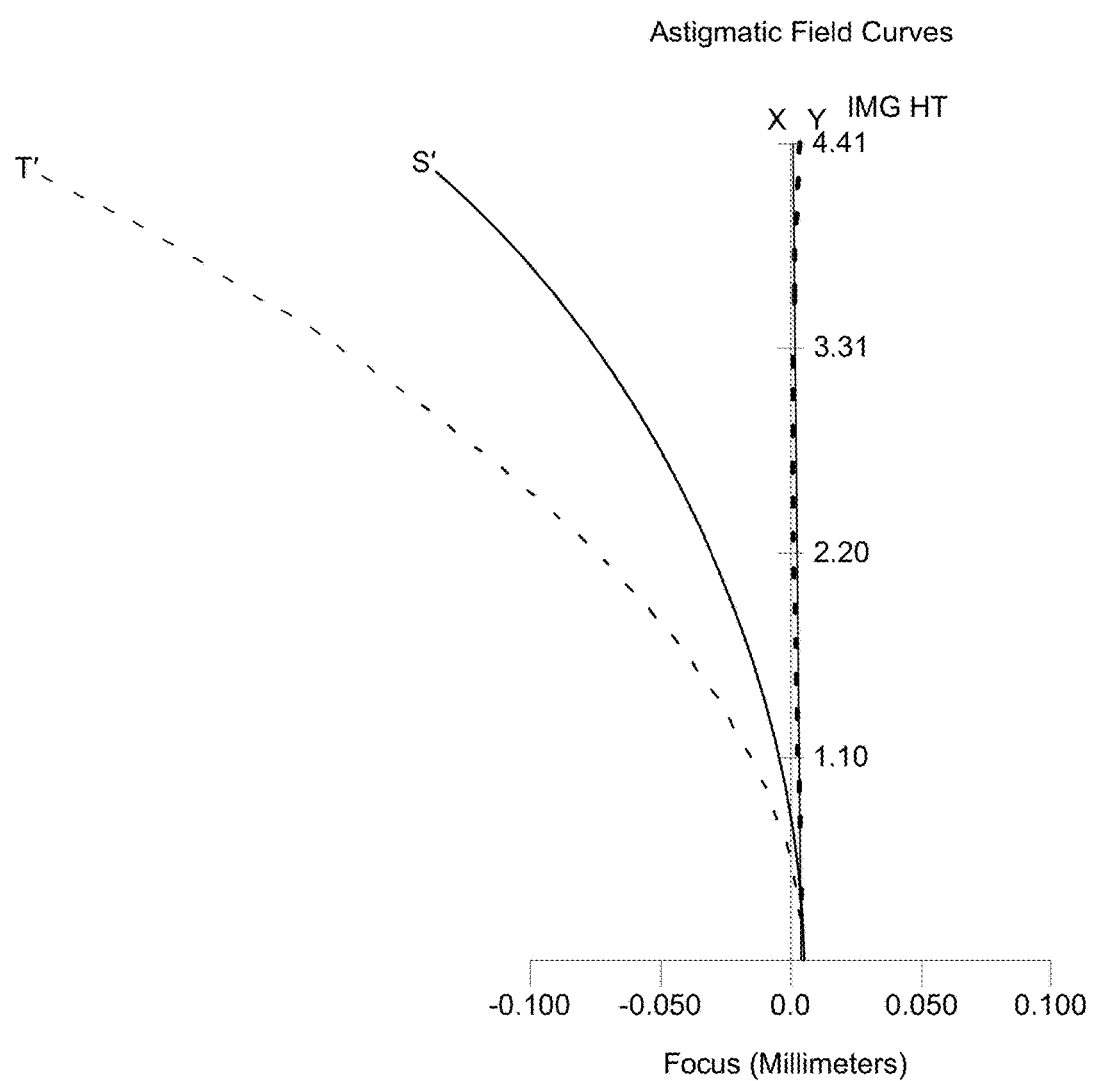
FIG. 8 shows astigmatic field curves for tangential fan (T) and sagittal fan (S) for the optical assembly illustrated schematically at FIG. 1A.

FIG. 8 shows astigmatic field curves for tangential (e.g., vertical) fan (T) and sagittal (e.g., horizontal) fan (S) for the optical assembly illustrated schematically at FIG. 1A as well as the tangential fan (T') and sagittal fan (S') for a similar optical assembly except that the thirteenth optical surface has no aspheric departure. FIG. 8 shows that without the asphere, the longitudinal astigmatism (T'−S')~0.75 mm in this example. With an aspheric departure in accordance with certain embodiments, e.g., on the fifteenth surface, such as has been described and illustrated in the example of FIGS. 1A-1B, the longitudinal astigmatism reduces to approximately zero. Moreover, the field curvature is approximately flat, e.g., <<50 microns, across the sensor format.

An optical design in accordance with the first embodiment exhibits an advantageous ratio of total track length to effective focal length, or TTL/EFL <12. The specific example illustrated schematically in FIG. 1A has a calculated TTL to EFL ratio of 11.88 in air, i.e., in physical geometrical units for the track and focal lengths, i.e., where the unity index of refraction or n≈1 is used throughout in the calculation. The TTL is less than 10 cm in certain embodiments, while EFL is generally less than 10 mm. The example of FIG. 1A has TTL=85 mm and EFL=7.1 mm. This example ratio can also be calculated optically by taking into account the indices of refraction of the glasses, polymers and/or other solid, liquid and/or gaseous materials of the cover plate element. When the TTL/EFL ratio is calculated optically as an optical track length over an optical focal length that takes into account the index of refraction of the material that forms the cover glass element (otherwise sometimes deemed part of a separate image sensor component to be coupled to the optical assembly), then the ratio is calculated to be approximately 11.94.

An effective focal length of the first group G1 that includes the first two lens elements E1 and E2 may be between approximately −5 and −20, or between −7 and −16, or between −9 and −14, or approximately −11, or approximately −12 or −11.3. The lens Group G2 including the lenses E3-E5 may have an effective focal length between +10 and +25, or between +12 and +23, or between +14 and +21, or between +16 and +19 or around +17 or around +18 or +17.2.

In this context, referring again to Table 1, which generally discloses certain specifications of the example optical assembly that is represented schematically in side view in FIG. 1A, Table 1 lists radius of curvature (RDY) values for each of the optical surfaces, i.e., numbered 1-10 and 12-19 in the left hand column of Table 1, of the eight lens elements including ten lenses E1-E10 that make up the first, second and third optical groups G1, G2, G3. Table 1 also lists thickness values (THI) for each of the lens elements and spacings between the lens elements, or the distances between each adjacent optical surface in the optical assembly illustrated schematically in side view in FIG. 1A.

Figure 9A:
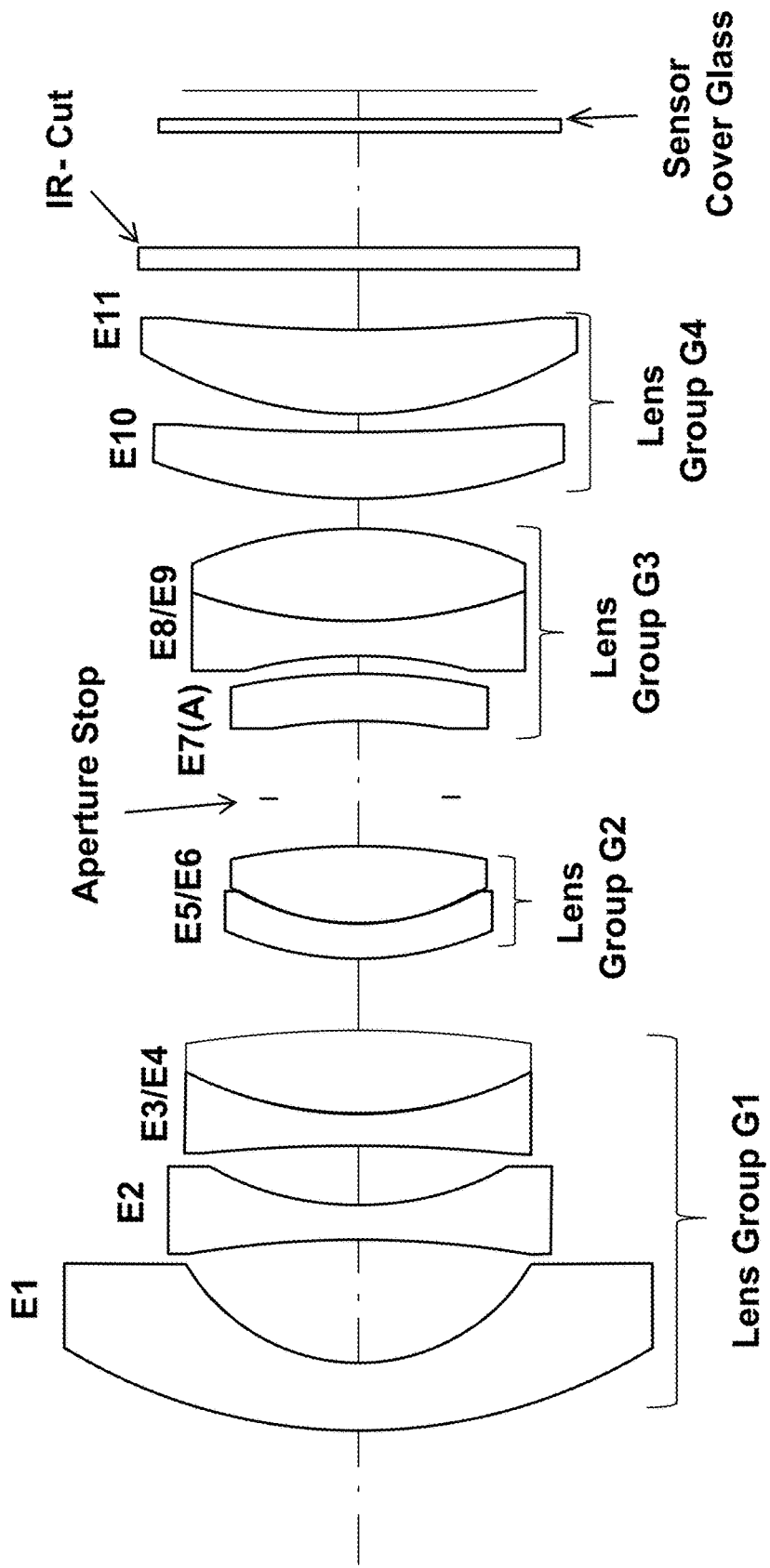
FIG. 9A schematically illustrates another optical assembly for a point action camera in accordance with certain embodiments.
Figure 9B:
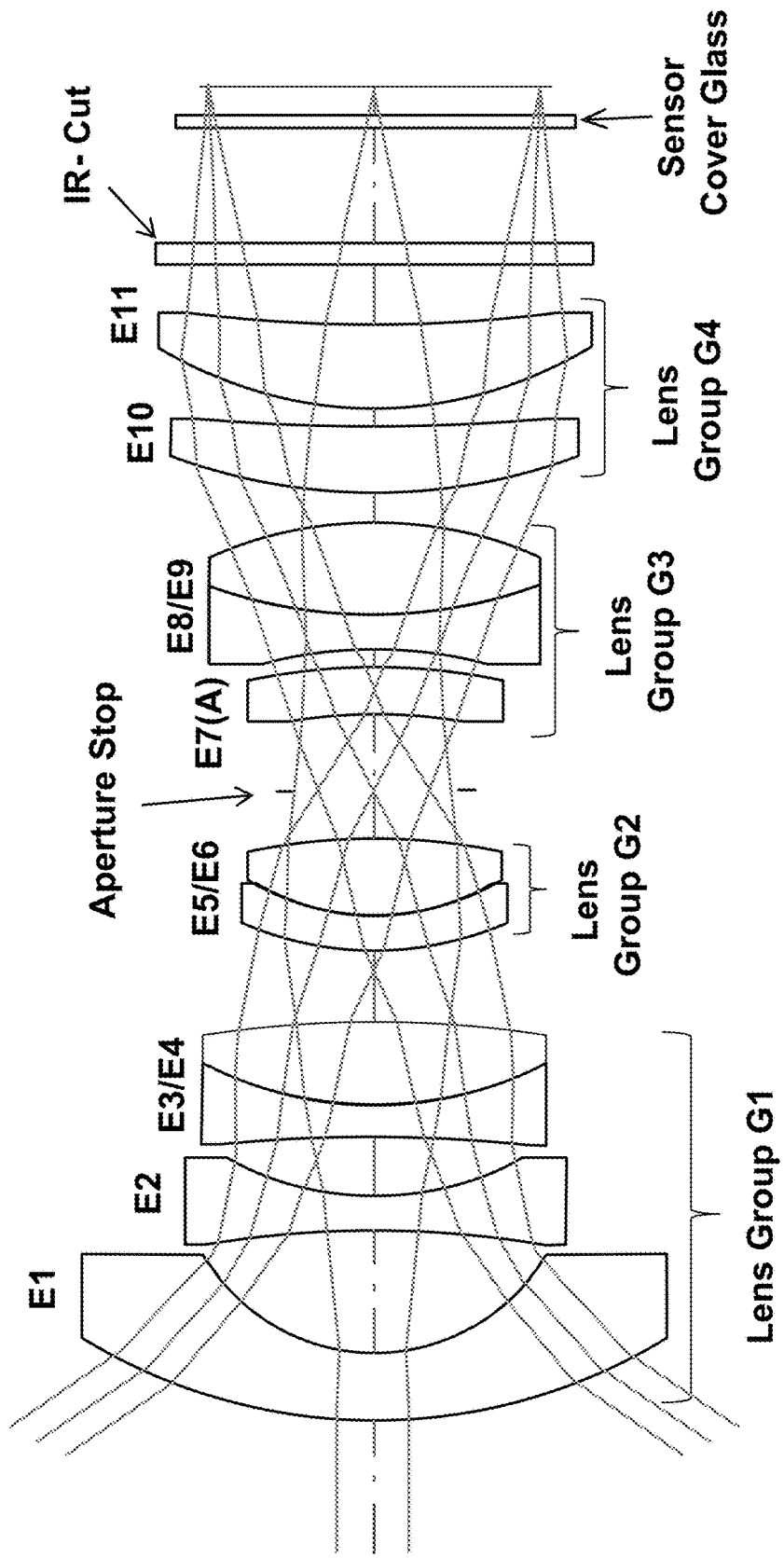
FIG. 9B is a ray trace diagram for the optical assembly illustrated schematically in FIG. 9A.

Referring to the example illustrated schematically in FIGS. 9A-9B, and in the plots shown in FIGS. 10-18, and quantitatively at Tables 4-6, an optical assembly in accordance with certain embodiments may include a first lens group G1, a second lens group G2, a third lens group G3 and a fourth lens group G4. The first lens group G1 is disposed nearer to the object or scene that is being imaged than the second lens group G2. The second lens group G2 is disposed between the first lens group G1 and the third lens group G3. The third lens group is disposed between the second lens group G2 and the fourth lens group G4. The image plane lies just beyond the fourth lens group G4. Together, the first, second, third, and fourth optical groups G1, G2, G3 and G4, respectively, cover a wide field of view, i.e., greater than 120 degrees, or in certain embodiment greater than 135 degrees and in others greater than 150 degrees and even in certain embodiments significantly close to 180 degrees. Alternatively, there may be two, or three, or five or more lens groups instead of four, or the entire optical assembly may form a single lens group.

Generally speaking, the lens group G1 is configured to collect wide field rays and reduce the field angle to groups G2 and G3. The group G2 is configured to provide advantageously low axial chromatic aberration and spherochromatism or variation of spherical with wavelength. The arrangement of G2 and G3 about the aperture stop advantageously balances field aberrations of multiple orders. The placement and configuration of the asphere E7(A) advantageously corrects higher order astigmatism.

The lens groups G2 and G3 are configured such that the optical assembly produces advantageously low imaging errors from aberrations, and particularly distortion and astigmatism. However, the configuration can include contributions within the second lens group G2 to the collection and reduction of wide field rays and/or contributions within the first lens group G1 and/or fourth lens group G4 to the correction of aberrations such as distortion and astigmatism. For example, one or more lens elements of the group G2 may have a material or shape characteristic tending to facilitate collection of wide angle rays and/or a surface of one or more lens elements of group G1 and/or G4 may have aspheric departure or another characteristic configured to assist in the correction of aberrations.

In the embodiment illustrated schematically at FIGS. 9A-9B, the first lens group G1 includes two singlet lenses and a doublet, from furthest to closest to the image plane, namely lens E1, and lens E2 and lenses E3/E4 form the doublet. Lens E1 comprises a convexo-concave lens, or meniscus, in the example embodiment of FIGS. 9A-9B. This means that the object facing surface of lens E1, which is the first surface of the optical assembly of the example embodiment of FIGS. 9A-9B, has a convex shape tending to converge incident light, while the image facing surface of lens E1, which is the second surface of the optical assembly of FIGS. 9A-9B, has a concave shape tending to diverge incident light. The lens E1 has a nominal overall optical power. This lens E1 may have an extended radius outside of an active radius which assists and facilitates a wide field of view feature of the optical assembly of FIGS. 9A-9B. The physical dimensional characteristics of the lenses of the optical assemblies of the embodiments described herein generally permit configuring the wide field of view optical assembly within a lens barrel of a point action camera and/or within a compact or miniature point action camera.

The lens E1 may be fixed, i.e., relative to the image plane and other fixed elements of the system. Alternatively, the lens E1 may be movable to permit focusing by automatic or manual actuation using, e.g., a voice coil motor, piezo, or MEMS coupled to the lens E1. In this alternative embodiment, a feedback based on analysis of image data received at the image sensor by a processor, an image processor or an image signal processor (ISP). Another optical group may include one or more movable lenses, mirrors or other optics. In this context, a zoom feature may also be provided optically and/or electronically. Thus, embodiments of point action cameras described herein include fixed focus, autofocus and autofocus zoom point action cameras. In certain embodiments, the lens E1 has an index of refraction at the sodium d line (i.e., 587.5618 nm) at around 1.88, or n(λd)≈1.9. The dispersion may be around 41. The lens E1 has little overall optical power, as mentioned, and serves primarily as a collecting lens that facilitates the wide field of view of the optical assembly.

Lens E1 has a larger diameter in order to collect rays at outer edges of the wide field of view and reduces the field angle for the subsequent lenses of the optical assembly. Lens group G1, and particularly lenses E1 and E2, generally serves to reduce the ray angle for the group G2 and G3 lens elements. Lens groups G2 and G3 generally serve to balance or correct field aberrations of multiple orders, including distortion and astigmatism errors. The overall optical design of the lens groups G2 and G3 generally serves to correct distortion, while the aspheric twelfth surface of the optical assembly of FIGS. 9A-9B generally serves to correct higher order astigmatism.

The lens element E2 of the lens group G1 has a biconcave structure in the example of FIGS. 9A-9B. In other words the object facing surface of the lens E2, which is the third surface of the optical assembly of FIGS. 9A-9B, has a concave shape, while the image facing surface of the lens E2, or the fourth surface of the optical assembly of FIGS. 9A-9B, also has a concave shape tending to diverge incident light rays. The lens E2 has a negative overall focal length and serves as a diverging optical element. In certain embodiments, the lens E2 has an index of refraction at the sodium d line (i.e., 587.5618 nm) at around 1.5, or $n(\lambda d) \approx 1.5$. The dispersion may be around 82.

The lens elements E3/E4 form a doublet, such that lenses E3 and E4 and physically attached. Only the object facing surface of E3 and the image facing surface of E4 are indicated in Table 1 as the slightly concave fifth optical surface and the slightly convex sixth optical surface of the optical assembly. The lens E3 has an index of refraction around 1.5 and a dispersion around 82, while the lens E4 has an index of refraction around 1.74 and a dispersion around 32.

The lens group G1 has an overall negative focal length, e.g., in one embodiment EFL (G1)≈−11.5 mm, and serves to collect and converge incoming light from an object, group of objects or a foreground, background or overall scene, including a wide field of view greater than 90 degrees in the horizontal and/or vertical dimensions, and typically 120, 135, or 150 degrees or more in the horizontal and/or 110-120 degrees or more in the vertical. The rays received from the optical group G1 are further optically reduced by optical group G2, which has a positive focal length, e.g., in one embodiment EFL (G2)≈37.2 mm. Optical group G2 serves to correct aberrations such as distortion before images are captured by an image sensor of a point action camera for viewing on a display, and/or for recording or storage or for data analysis, monitoring, security or surveillance and/or for transmission and/or image processing.

The optical group G2 in the example of FIGS. 9A-9B includes a doublet. Lenses E5 and E6 are attached. Lens E5 has an index of refraction around 81 and a dispersion around 23, while lens E6 has an index of refraction around 62 and a dispersion around 63. The object facing surface of E5 is convex and the image facing surface of E6 is convex, such that the E5/E6 doublet has a strong positive focal length, which in the illustrated example of FIGS. 9A-9B is 37.2 mm.

An aperture stop is disposed between the E5/E6 doublet of the second optical group G2 and the aspheric lens element E7(A) of the third optical group G3. Alternatively, an aperture stop may be disposed between the lens groups G1 and G2, whatever number of optical elements each may comprise. An aperture stop may be located differently and there may be one or more additional apertures within the optical assembly.

The third optical group also includes a doublet including attached lenses E8 and E9. In certain embodiments, the image facing surface of lens E8 and the object facing surface of the lens E9 are in direct contact. An adhesive or other standard process of coupling constituent lenses of a doublet may be used, which process may depend upon the materials of the constituent lenses E8 and E9. In certain embodiments, the lens E8 has an index of refraction at the sodium d line (i.e., 587.5618 nm) at around 1.76, or $n(\lambda d) \approx 1.76$. The dispersion of lens E8 may be around 26. In certain embodiments, the lens E9 has $n(\lambda d) \approx 1.62$. In certain embodiments, the lens E9 has a dispersion around 63. The E8/E9 doublet overall serves to configure the light rays before becoming incident upon the lens element E10 of the fourth lens group G4.

Referring to FIGS. 9A-9B, there a significant advantage to having an optical assembly in accordance with certain embodiments, wherein the E8/E9 doublet, which is shown disposed between the asphere E7(A) and the singlet E10 in FIGS. 9A-9B, is configured to correct oblique aberrations.

The lens element E7(A) has a concavo-convex shape. The object facing surface of the lens E7(A), which is the twelfth surface of the optical assembly of FIGS. 9A-9B, has a concave shape which converges incident light. The twelfth surface of the optical assembly of FIGS. 9A-9B also has a significant aspheric departure in this example embodiment. The object facing surface of the lens E7(A), which is the twelfth surface of the optical assembly of FIGS. 9A-9B, has a concave shape, while the image facing thirteenth surface has a convex shape. In certain embodiments, the lens E7(A) has an index of refraction at the sodium d line (i.e., 587.5618 nm) at around 1.5, or $n(\lambda d) \approx 1.5$. The dispersion of the lens E8(A) may be around 82. Table 1 indicates certain aspheric parameters for the lens element E7(A).

After the doublet E8/E9 of the third optical group G3, there are two singlets E10 and E11 each of the fourth optical group G4. Each of lenses E10 and E11 has a convexo-quasi planar or convexo-concave shape. In certain embodiments, the lens E10 has an index of refraction at the sodium d line (i.e., 587.5618 nm) at around 1.62, or $n(\lambda d) \approx 1.62$. The dispersion of lens E10 may be around 63. In certain embodiments, the lens E10 has $n(\lambda d) \approx 1.62$. In certain embodiments, the lens E10 has a dispersion around 63. The fourth optical group G4 serves to deliver a telecentric cone to the image sensor.

Between the twentieth surface of the optical assembly of FIGS. 9A-9B and the image plane are an IR filter and a cover plate. The IR filter serves to cut out infrared light that can otherwise interfere with the function of a silicon-based image sensor to collect visible image data. In certain embodiments, the IR filter is disposed within a same housing as the optical assembly or the groups G2, G3 and G4 if the group G1 is separately packaged or the groups G3 and G4 if groups G1 and G2 are separately packaged. The cover plate serves to protect the image sensor from incident dust, water, oxygen or other corrosive or artifact producing elements that may be present in the ambient space surrounding the point action camera. A separate baffle may be included to reduce the amount of stray light that may become otherwise incident upon the image sensor. Each of the IR filter and the cover glass may have a refractive index around 1.5 and a dispersion around 64. For example, NBK7 Schott glass may be used.

The aspheric departure of the twelfth optical surface of the optical assembly in the example embodiment of FIGS. 9A-9B serves to advantageously significantly reduce higher order astigmatism errors that would be otherwise inherent in a wide field of view system without an aspheric surface in accordance with embodiments described herein. Moreover, the advantageous design of the optical assembly of FIGS. 9A-9B, and specifically of the second and third optical groups G2 and G3, and more specifically of the aspheric lens element E7(A), and still more specifically of the aspheric object facing surface of the lens element E7(A) permits the optical assembly in this embodiment to have a more efficient manufacturability than conventional designs that contain multiple aspheric surfaces and/or multiple aspheric lenses or other optical elements.

FIGS. 9A-9B has H(θ)/f*θ=1.078. In another similar embodiment H(θ)/f*θ=1.174. In other embodiments, H(θ)/f*θ is greater than 1.2, 1.3, 1.4 and even 1.5, and in other embodiments H(θ)/f*θ is approximately 1.

Table 1 generally discloses certain specifications of the example optical assembly that is represented schematically in side view in FIG. 9A. Table 4 lists RDY, which is the radius of curvature of the optical surface. Table 4 also lists THI which are the thicknesses of the lenses E1-E10 and the spaces between the lenses E1-E10 in sequential order. The row 1 thickness describes the thickness of the first lens E1 in this embodiment. The row 2 thickness describes the thickness of the spacing between the first lens E1 and second lens E2. The spacing may include air, or for example dry air or nitrogen gas or vacuum or a noble gas, or a liquid such as water. The row 3 describes the thickness of the second lens E2. The row 4 describes the air spacing between the second lens E2 and the object facing surface of the E3/E4 doublet in this example. The row 5 describes the thickness of the third lens E3. The row 6 describes the thickness of the fourth lens E4. There is no spacing between E3 and E4 in this example. The row 7 describes the thickness of the spacing between E3/E4 doublet and the E5/E6 doublet in this example. The row 8 describes the thickness of the lens E5 and the row 9 describes the thickness of the lens E6. The row 10 describes the thickness of the spacing between the doublet E5/E6 and the aperture stop. The row 11 (STO) describes the thickness of the spacing between the aperture stop and the lens element E7(A). The row 12 describes the thickness of the aspheric lens element E7(A). The aspheric coefficients A-E for the eighth lens E8(A) are provided just below the row 15. The aspheric equation is provided at the top of Table 2. The row 13 describes the thickness of the spacing between E7(A) and the E8/E9 doublet. There is no spacing between the lenses E8 and E9 in this example wherein the lens element E8/E9 is a doublet. The row 14 describes the thickness of the lens E8, while the row 15 describes the thickness of the lens E9. The row 16 describes the thickness of the spacing between the E8/E9 doublet and the lens E10. The row 17 describes the thickness of the lens E10. The row 18 describes the thickness of the spacing between E10 and E11. The row 19 describes the thickness of the lens E11. The row 20 describes the thickness of the spacing between E11 and the IR cut filter. The row 21 describes the thickness of the IR cut filter. The row 22 describes the spacing between the IR cut filter and the sensor cover glass. The row 23 describes the thickness of the sensor cover glass. The row 24 describes the thickness of the spacing between the sensor cover glass and the image plane. Eight lens elements including five singlets and three doublets, or eleven lenses E1-E11 make up the example optical assembly that is illustrated schematically at FIG. 9A, while a point action camera or other compact digital camera includes the IR cut filter, cover glass and an image sensor packaged within a housing along with the optical assembly. The first two lenses E1-E2 and the doublet E3/E4 form a first optical group G1, the E5/E6 doublet forms the second optical group G2, the E7(A) singlet and E8/E9 doublet form the third optical group G3, and the final two lens elements E10 and E11 form the fourth optical group G4.

The radii of curvature are, in the single aspheric surface example, approximately, i.e., within manufacturing tolerances, the same everywhere along the optical surface for each of the first through eleventh and thirteenth through nineteenth surfaces of the optical assembly of FIG. 9A. In Table 4, the row 6 describes the curvature of both the sixth and seventh surfaces, which are the image facing surface of the lens E3 and the object facing surface of the lens E4, which have the same curvature. Likewise, the row 9 in Table 4 describes the curvature of both the tenth and eleventh surfaces, which are the image facing surface of the lens E5 and the object facing surface of the lens E6, which have the same curvature. Also, the row 15 in Table 4 describes the curvature of both the fifteenth and sixteenth surfaces, which are the image facing surface of the lens E8 and the object facing surface of the lens E9, which have the same curvature. That is, the coefficients A thru E are each approximately zero for 21 out of 22 surfaces of the embodiment of FIG. 9A in the single aspheric surface example of a wide field of view optical assembly for a point action camera or compact camera, or miniature camera module or other camera or camera module including a single aspheric lens element, or only one aspheric lens element, and exhibiting advantageously low distortion and low astigmatism, as well as high MTF at Nyquist and half Nyquist frequencies, and low lateral chromatic aberration, and compactness in three spatial dimensions. The departures from spherical of the twelfth surface are represented in Table 4 as nonzero coefficients A-C, which correspond mathematically to the coefficients indicated in the formula that is provided above the Table 2 in the illustration (where D=0 and E=0 in this example).

This formula with the non-zero coefficients A-C as indicated in Table 4 represent the aspheric curvature of the surface 12 or object facing surface of the lens E7(A) of the example optical assembly that is illustrated schematically in FIG. 9A.

The specification data of Table 4 represent the first order software inputs to complete the optical model. FNO is F number and is approximately 2.4 in this example. DIM is the dimension which is mm. WL are the wavelengths which are in nanometers, and are 650 nm (red), 610 nm (orange), 555 nm (yellow), 510 nm (green) and 465 nm (blue) in this example.

Table 5 shows aspherical and spherical SAG data for the twelfth surface of the optical assembly of FIG. 9A, or the object facing surface of lens E7(A). These aspherical SAGs for an example twelfth surface are compared with would be true spherical SAGs in Table 5 for different distances Y from the vertex center at Y=0 to Y=3.5 (mm) in steps of 0.14 (mm).

Figure 10:
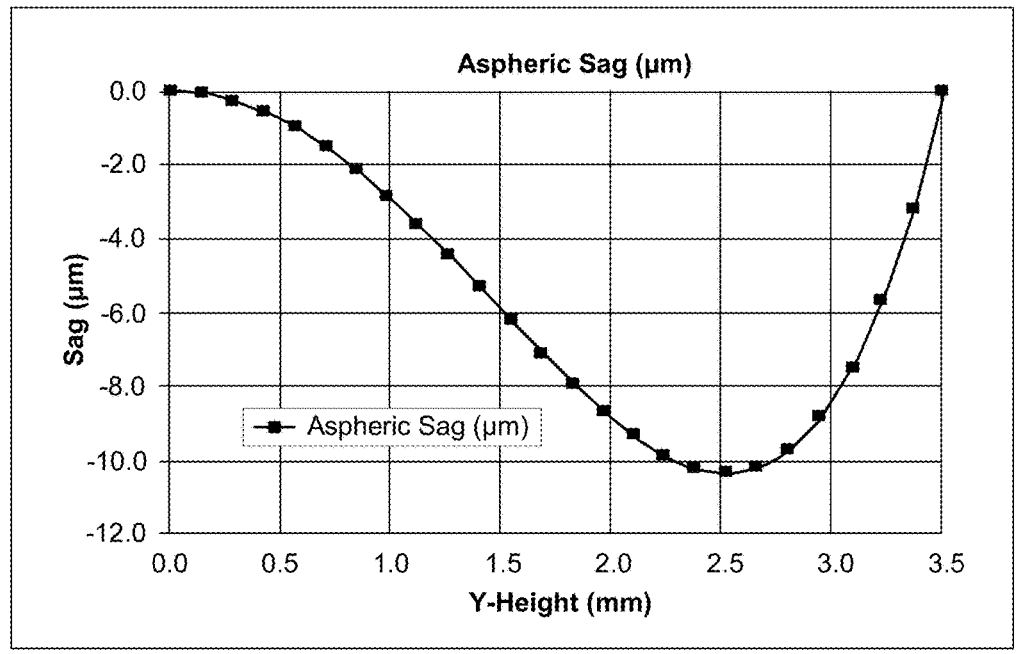
FIG. 10 is a plot of aspheric sag versus radial distance from the center of the asphere for the fifteenth surface from the object, or the object side surface of the seventh lens element E7(A), in the example optical assembly illustrated schematically in FIG. 9A.

The aspheric sags in Table 6 that are plotted in FIG. 10 are the aspheric sag difference numbers shown in Table 5, which are the differences from the best fit sphere sags of the aspheric surface 12 or object facing surface of the lens E7(A) in the example of FIG. 9A. Table 6 also shows values of aspheric sag slope that are plotted in FIG. 11.

Referring now to FIGS. 9A-18, FIG. 9A is described in detail above. FIG. 9B schematically illustrates a ray trace diagram for the optical assembly of FIG. 9A. FIG. 10 is a plot of aspheric sag versus radial distance, or the data provided in the second column from the left in Table 6, for the 12th optical surface from the object in the example optical assembly illustrated schematically in FIG. 9A. The aspheric sag for the 12th surface in this example has a sag maximum between 2 mm and 3 mm from the center of the 12th lens surface. The sag has minimum values between approximately −10 μm and −12 μm both at the center and at the edge about 3.5 mm from the center. The sag plot has a width of approximately 3.5 mm at −6 µm. The sag has a point of inflection at approximately 1.5 mm from the center of the 12th lens surface.

Figure 11:
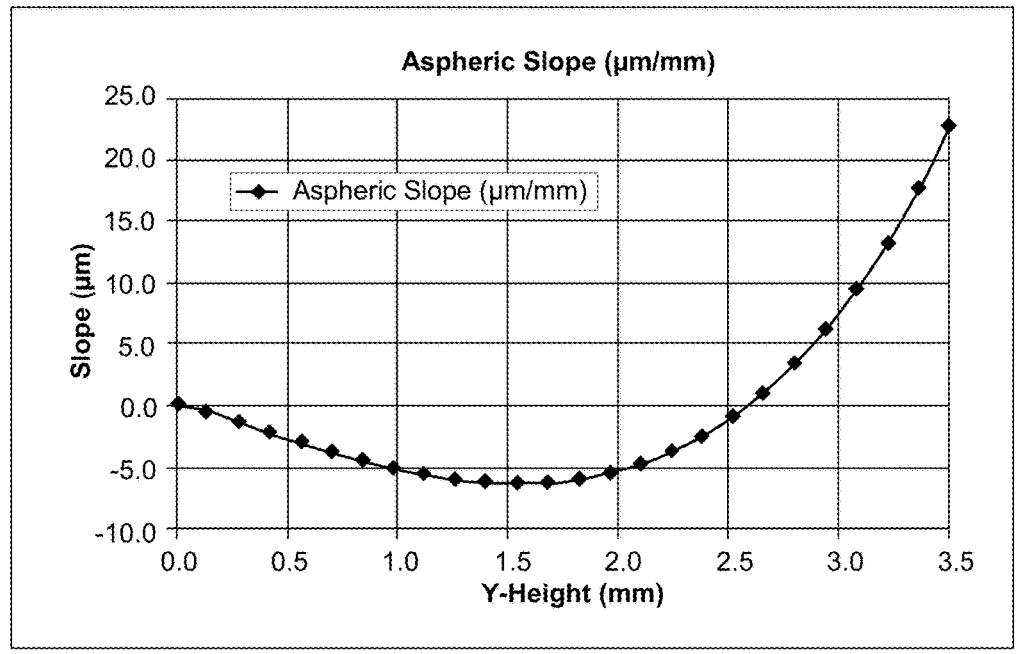
FIG. 11 is a plot of slope of aspheric sag versus radial distance from the center of the asphere for the fifteenth surface from the object, or the object side surface of the seventh lens element E7(A), in the example optical assembly illustrated schematically in FIG. 9A.
Figure 13A:
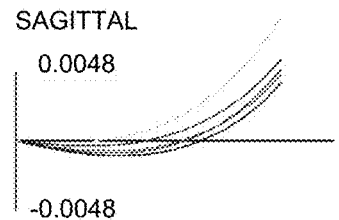
Figure 13B:
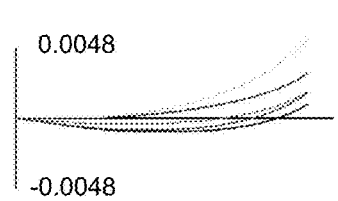
Figure 13C:
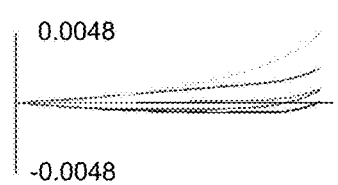

FIG. 11 is a plot of slope of aspheric sag versus radial distance, or the data provided in the fourth column from the left (or rightmost column) in Table 6, for the 12th optical surface in the example optical assembly illustrated schematically in FIG. 9A. The aspheric sag slope has a minimum around 1.5 mm from the center of the 12$^{th}$ lens surface between −5 µm/mm and −10 µm/mm. The aspheric sag slope has a highest value at the outer edge of the 12th lens surface of around 23 µm/mm. The aspheric slope has a point of inflection between around 0.5 mm and 1 mm from the center of the 12th lens surface.

While the asphere may be disposed on other optical surfaces and/or on other lens elements in other embodiments, the 12th surface is selected in the embodiment illustrated by example in FIG. 9A at least in part due to the advantageous ratio of the chief ray and marginal ray heights at that location within the optical assembly.

An image sensor, e.g., a charge coupled device (CCD) or a complementary metal oxide semiconductor (CMOS) device is disposed at the image plane in embodiments that include an assembled compact, miniature, point action or point of view camera or other compact digital camera. The optical assembly may be configured for later assembly with an image sensor. In this sense, the first and second optical groups may be manufactured or assembled separately and later combined, and in general, parts of the optical assembly or point action camera may be separately manufactured or assembled and it is possible in certain embodiments to replace, restore or realign optical group G1, optical group G2, optical group G3 and/or certain other groups of one or more of the lenses or other optical components of the optical assembly or point action camera.

FIGS. 12A-12D respectively show plots of tangential ray aberrations respectively at 56°, 39.2°, 28° and 0° for the wide field of view objective assembly illustrated in FIG. 9A. FIGS. 12A-12D and 13A-13D show four pairs of graphs, where each pair illustrates the tangential and sagittal rays at one of these four field angles. The independent variable (horizontal axis) is the relative coordinate of a ray over the pupil diameter. The vertical axis has a maximum distance measure of +/−approximately five microns or a spread of ten microns or less over a 120 degree field (which is clearly advantageous over a conventional system that may have, e.g., a 20 micron spread). The vertical axis therefore represents the transverse ray aberration (ray interception distance from the ideal focal point) of a ray passing through a specific relative pupil position. Graphs 12A-12D (tangential plane) and 13A-13D (sagittal plane) show the transverse ray aberrations for an on-axis ray bundle as the bundle is refracted through the lens elements of the optical assembly of FIG. 9A.

Figure 12A:
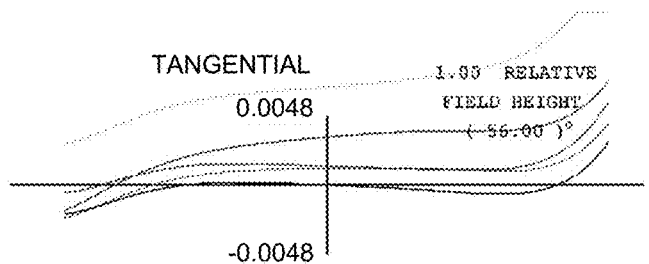
FIGS. 12A-12D and 13A-13D respectively show plots of tangential and sagittal ray aberrations for the wide field of view objective assembly illustrated in FIG. 9A.
Figure 12B:
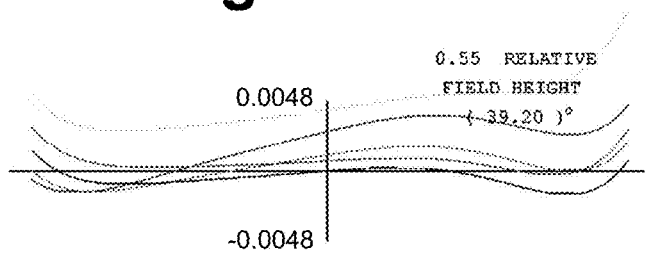
Figure 12C:
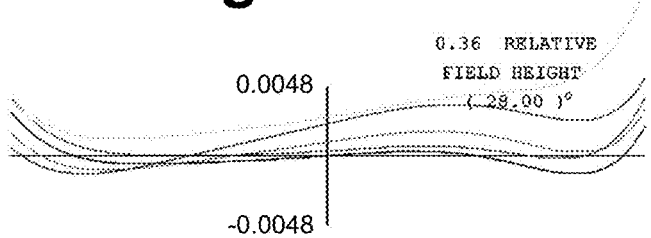
Figure 12D:
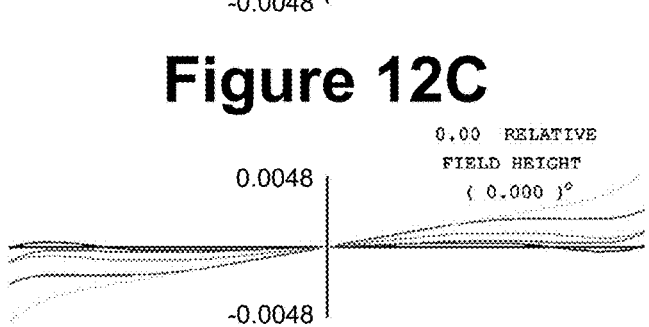
Figure 13D:
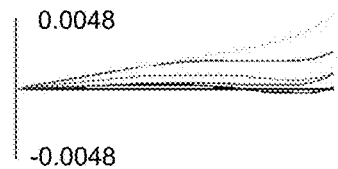

In FIGS. 12D and 13D, the performance of the embodiment of FIG. 9A is illustrated for a ray bundle at zero degrees with the optical axis. Graphs 12C and 13C show the performance of the optical assembly of FIGS. 9A-9B for a ray bundle when the light source is moved providing an incident angle of 28 degrees with the optical axis. Graphs 12B and 13B show the performance of the optical assembly of FIGS. 9A-9B for a ray bundle when the light source is moved providing an incident angle of 39.2 degrees with the optical axis. Graphs 12A and 13A show the performance of the optical assembly of FIGS. 9A-9B for a ray bundle when the light source is moved providing an incident angle of 56 degrees with the optical axis. LCA is demonstrated in FIGS. 12A-12D as the separation of the rays which correspond to five different colors or wavelengths, which are in this example 650 nm, 610 nm, 555 nm, 510 nm and 465 nm.

Figure 14:
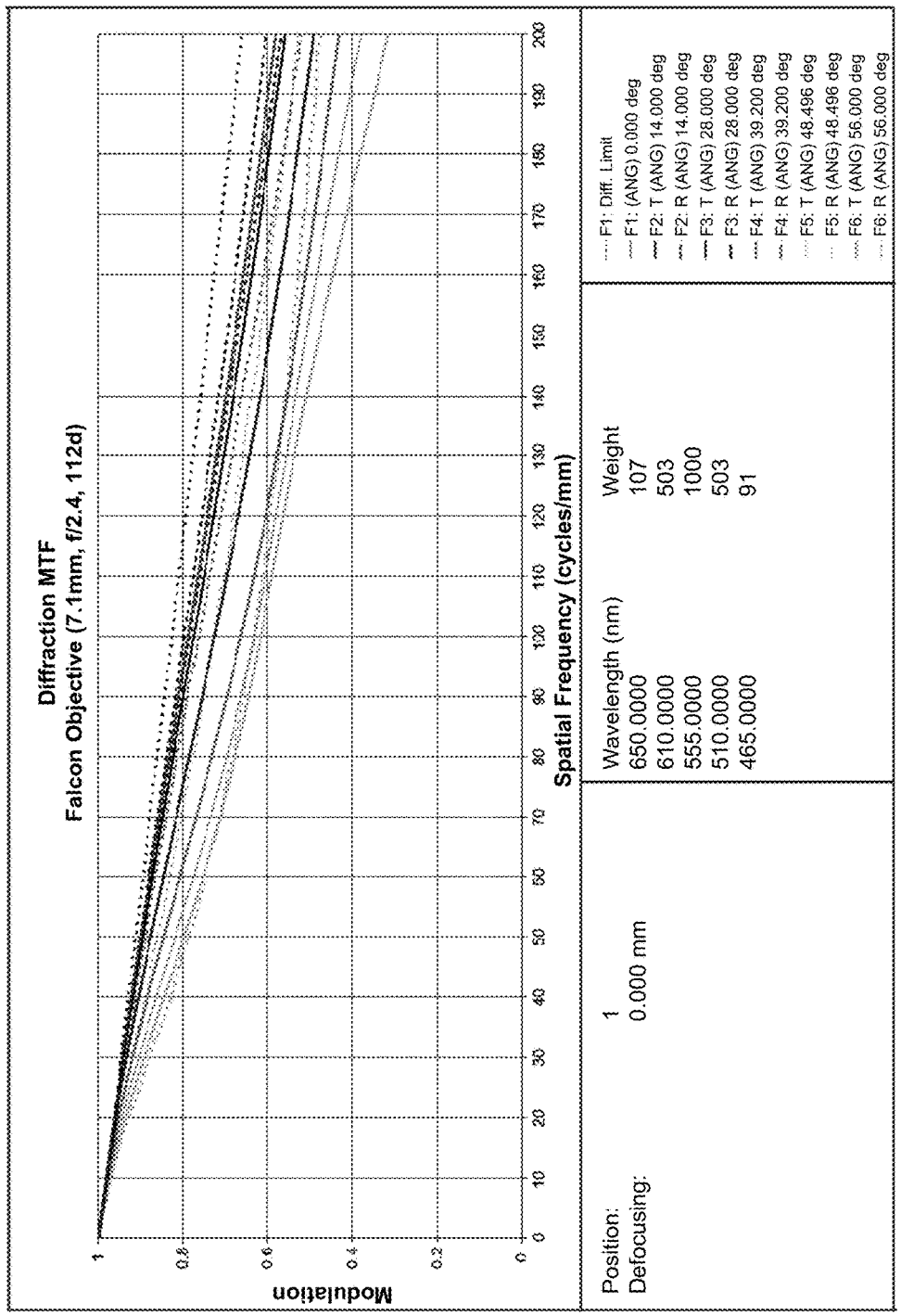
FIG. 14 illustrates diffraction modulation transfer function (MTF) plots of contrast vs. spatial frequency for tangential and sagittal rays impinging upon the optical assembly of FIG. 9A normal to the optical axis (F1), 15 degrees from normal to the optical axis (F2), 35 degrees from normal to the optical axis (F3), 55 degrees from normal to the optical axis (F4), and 75 degrees from normal to the optical axis (F5).

FIG. 14 illustrates the polychromatic diffraction modulation transfer function (MTF) plots of contrast vs. spatial frequency for pixels lying normal to the optical axis (F1), 14 degrees from normal to the optical axis (F2), 28 degrees from normal to the optical axis (F3), 39.2 degrees from normal to the optical axis (F4), 48.5 degrees from normal to the optical axis (F5), and 56 degrees from normal to the optical axis (F6). Those pixels lying at 56 degrees from normal to the optical axis would be those near the edge of an image captured with a point action or other compact digital camera assembly having a field of view of 120 degrees.

A point action camera or other compact digital camera is provided herein having a wide field of view of more than 90 degrees, and may be 120 degrees or more. Advantageously high areas under the curves are noticeable in FIG. 14. In accordance with FIGS. 12A-12D, the plots of FIG. 14 demonstrate that the image quality of the embodiment of FIG. 9A is advantageous. For example, all of the plots are above 0.3 at 200 cycles/mm and all of the plots are above 0.6 at 100 cycles/mm. This indicates that the optical assembly of FIG. 9A is configured to provide images of objects with exceptional contrast so that in tandem with an image sensor having pixels that are no larger than a few microns, e.g., 2.4 microns, high quality images can be captured.

Figure 15:
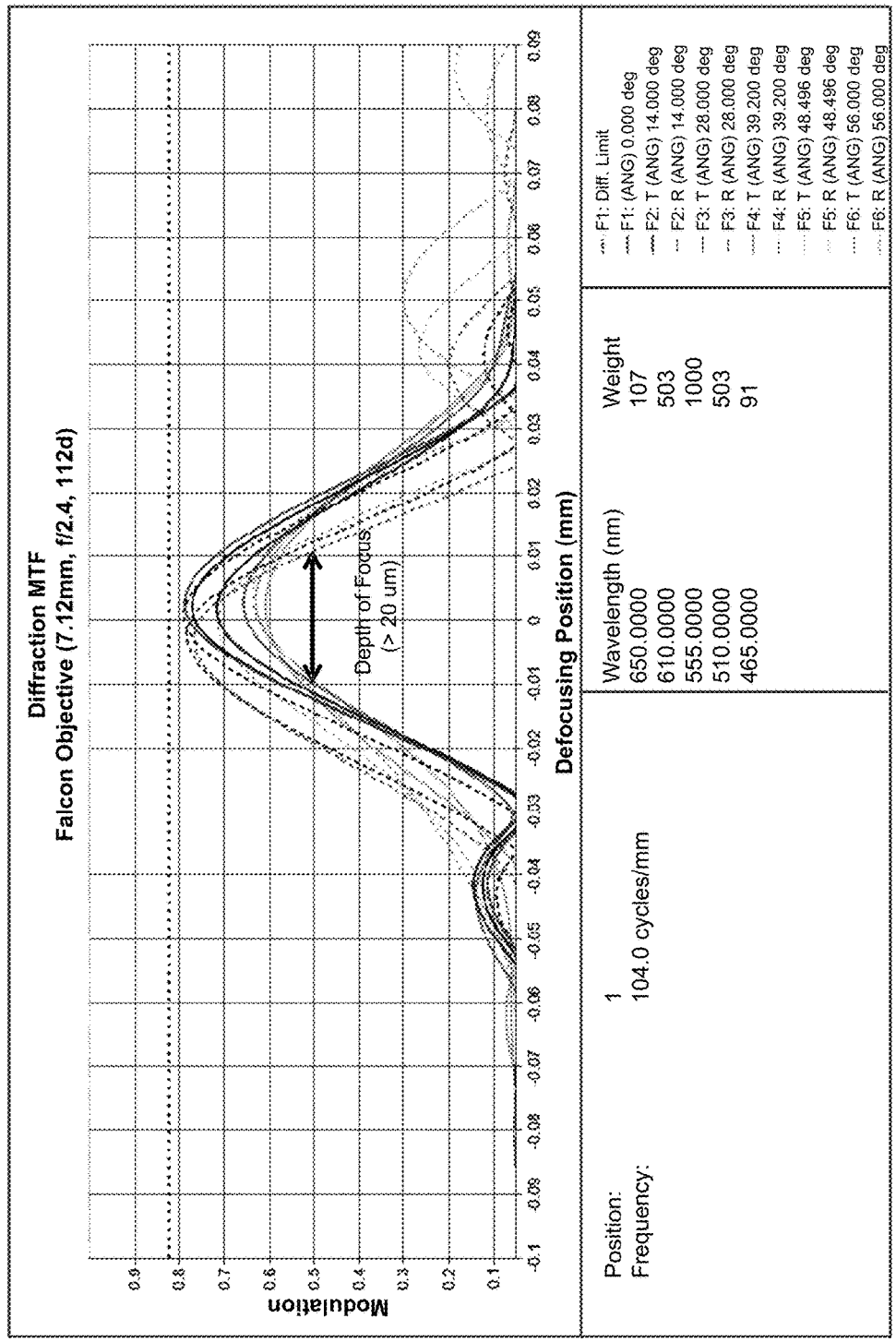
FIG. 15 illustrates diffraction modulation transfer function (MTF) plots of modulation vs. defocussing position for tangential and sagittal rays impinging upon the optical assembly of FIG. 9A normal to the optical axis (F1), 14 degrees from normal to the optical axis (F2), 28 degrees from normal to the optical axis (F3), 39.2 degrees from normal to the optical axis (F4), and 56 degrees from normal to the optical axis (F5).

FIG. 15 shows plots of diffraction modulation transfer function (MTF) versus defocussing position for rays incident at 0, 14, 28, 39 and 56 degrees. The plots of FIG. 15 show that an advantageous depth of focus is provided by the optical assembly of FIGS. 9A-9B that is greater than 20 microns.

Figure 16:
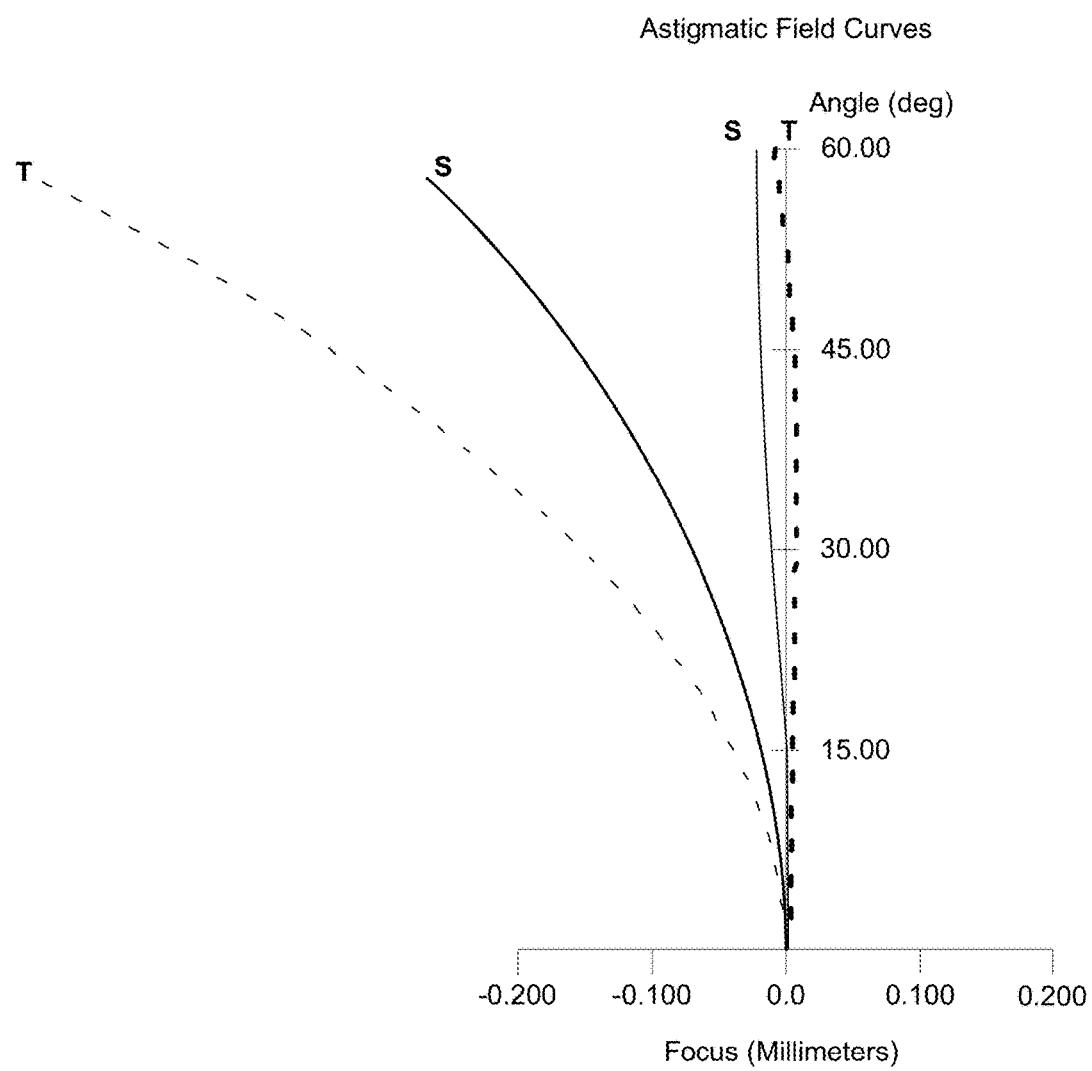
FIG. 16 shows astigmatic field curves for tangential fan (T) and sagittal fan (S) for the optical assembly illustrated schematically at FIG. 9A including the aspheric lens element E7(A). Also shown are the field curves for a similar optical assembly except without an aspheric lens element.

FIG. 16 shows astigmatic field curves for tangential (e.g., vertical) fan (T) and sagittal (e.g., horizontal) fan (S) for the optical assembly illustrated schematically at FIG. 9A as well as the tangential fan (T') and sagittal fan (S') for a similar optical assembly except that the twelfth optical surface has no aspheric departure. FIG. 16 shows that without the asphere, the longitudinal astigmatism (T'-S')~0.75 mm in this example. With an aspheric departure in accordance with certain embodiments, e.g., on the twelfth surface, such as has been described and illustrated in the example of FIGS. 9A-9B, the longitudinal astigmatism reduces to approximately zero. Moreover, the field curvature is approximately flat, e.g., <<50 microns, across the sensor format.

An optical design in accordance with the second embodiment exhibits an advantageous ratio of total track length to effective focal length, or TTL/EFL <8. The specific example illustrated schematically in FIG. 9A has a calculated TTL to EFL ratio of 8 in air, i.e., in physical geometrical units for the track and focal lengths, i.e., where the unity index of refraction or n≈1 is used throughout in the calculation. The TTL is less than 8 cm in certain embodiments, while EFL is generally less than 10 mm. The example of FIG. 9A has TTL=55 mm and EFL=7.12 mm. This example ratio can also be calculated optically by taking into account the indices of refraction of the glasses, polymers and/or other solid, liquid and/or gaseous materials of the cover plate element.

The example embodiment of FIG. 9A also features high performance with regard to suppression of stray light. High dynamic range (HDR) is achieved in the example of FIG. 9A because stray light is suppressed. Stray light can be caused by two surface ghosts (double bounce ghosts from lens surface), ghosting originating from sensor and subsequent reflections from lens surface back to sensor ("sensor sees itself"), scattered light from mechanical structure, and scattered light from edges of lens elements. Stray light contributions are suppressed via design process by minimizing the number and location of near normal incidence surfaces (e.g., angle of incidence or refractive is –0 degrees). The embodiment of FIG. 9A has 90% or more of return ghosts foci more than +/–2 mm from image sensor plane.

Figure 17:
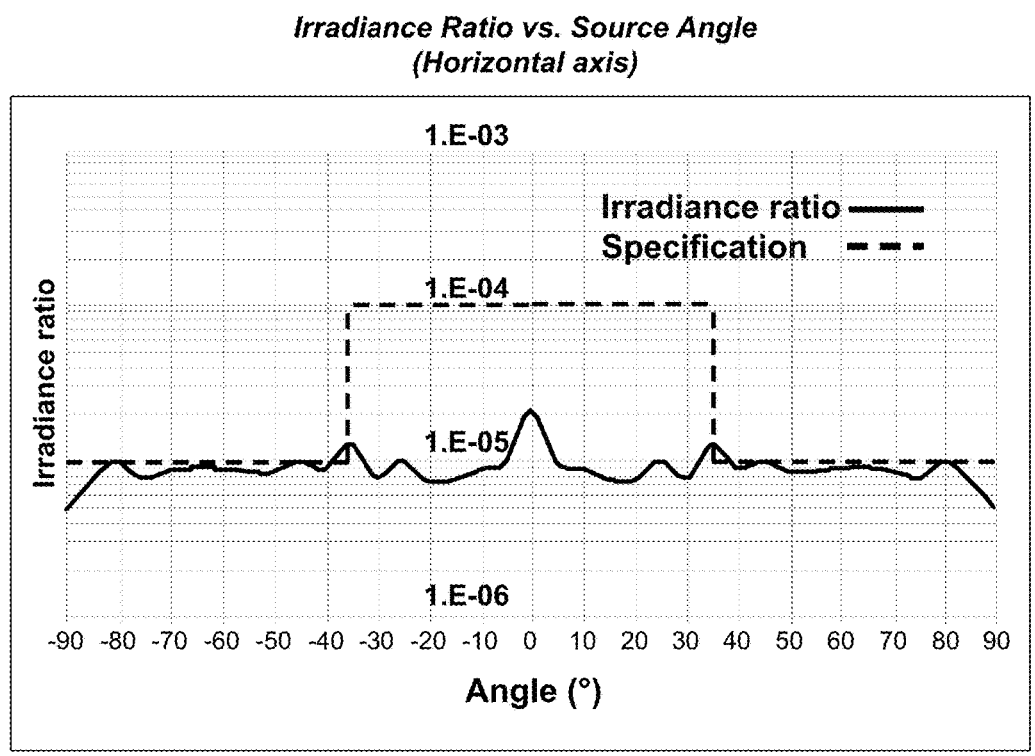
FIG. 17 shows a plot of Irradiance Ratio vs. Source Angle for an optical assembly in accordance with the example embodiment illustrated at FIG. 9A.

FIG. 17 is a plot of irradiance ratio versus angle, where $$\text{Irradiance ratio} = \frac{\text{Stray light peak irradiance}}{0° \text{ in-field peak irradiance}}$$

The irradiance ratio is significantly below 1/10,000, and is approximately 1/100,000.

Figure 18:
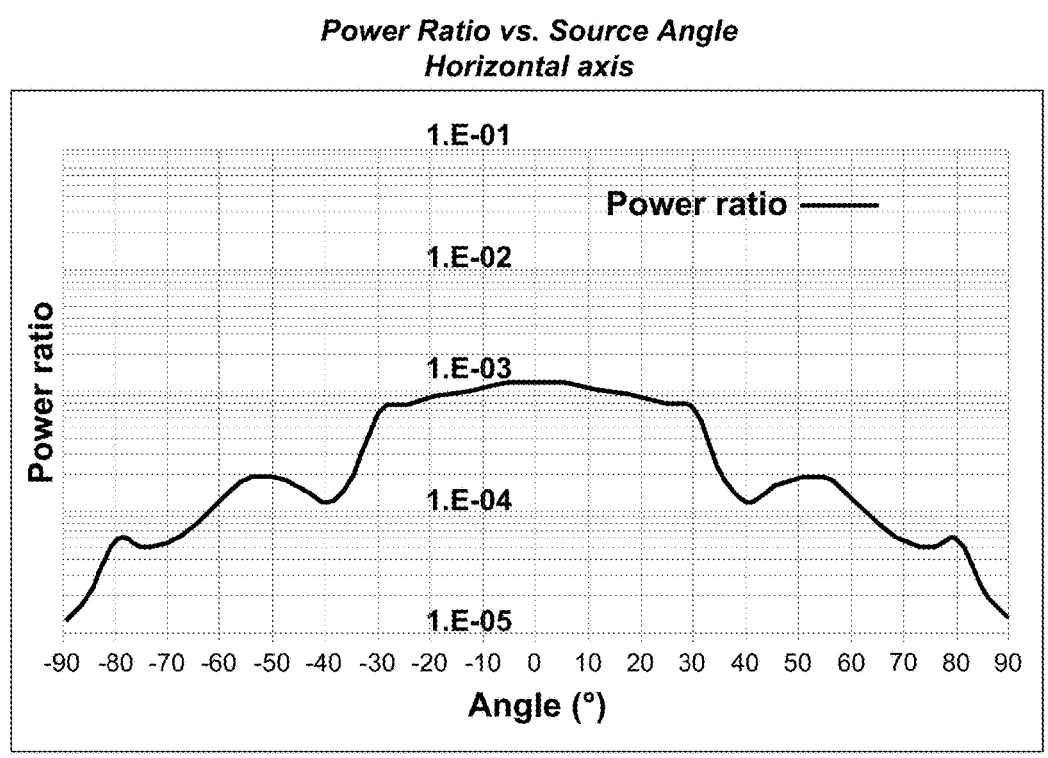
FIG. 18 shows a plot of Power Ratio vs. Source Angle for an optical assembly in accordance with the example embodiment illustrated at FIG. 9A.

FIG. 18 is a plot of power ratio versus angle, where $$\text{Power ratio} = \frac{\text{Stray light total power}}{0° \text{ in-field total power}}$$

The power ratio is significantly below 1/100, and is approximately 1/1000.

General Discussion

Yet greater dynamic capacities in the process of building a point action camera with both wide field of view and heretofore unknown reduction in distortion, astigmatism and combinations of these optical aberrations that have been otherwise problematic in conventional wide field of view systems is provided herein with optical assemblies in accordance with multiple embodiments that contain only one aspheric lens element, e.g, lens element E8(A) of the example of FIG. 1A or lens element E7(A) of the example of FIG. 9A in combination with five or six other lens elements that have spherical curvatures to understood tolerances. One or both surfaces of the single aspheric lens element of these embodiments may have significant calculated aspheric departure, while the other lens elements are spheres (or in other embodiments cylinders or a combination of cylinders and spheres).

Example embodiments have been provided above wherein only one optical surface within the optical assembly has a specifically-intended and advantageous aspheric departure. In the embodiments illustrated schematically in side view in FIGS. 1A and 9A, five or six lens elements, when the doublets are characterized as single lens elements, do not have departures from spherical (i.e., at least none that exceed specified optical tolerances).

In another set of embodiments, one or more aspheric lens element is/are provided in the first lens Group G1. For example, lens element E1 and/or E2 may have one or more surfaces with aspheric departures that serve to reduce astigmatism in a wide field of view point action camera system that is also or already configured with significantly reduced distortion characteristics, particularly at the edges of the field of view (e.g., 50°, 55°, 60°, 65°, 70°, or 75° or more from normal to the optical axis), where conventional uncorrected wide field of view systems tend to exhibit unacceptably high combinations of either or both of distortional and astigmatic aberrations. In certain embodiments, only lens element E1 or lens element E2 has one or both surfaces that exhibit calculably advantageous aspheric departures.

In specific embodiments, only a single surface, e.g., the 1st, 2nd, 3rd or 4th surface, of the optical assembly has aspheric departure that provides a point action camera with a wide field of view along with unprecedented reductions in distortional, astigmatic or combinational aberrations that would be otherwise inherent in less thorough designs, in designs without any aspheric surface or surfaces and/or in designs without the specific optical design shape and/or aberrational error correctional characteristics provided herein. In a specific alternative embodiment, only the first lens surface of the optical assembly, or the surface of lens E1 that faces the object, includes demonstratedly and advantageously significant aspheric departure. In another embodiment, the image facing surface of lens E1 has a uniquely aspherical attributional curvature characteristic within the optical assembly of a wide field of view point action camera.

Alternative embodiments have a single aspheric surface within the lens group G2 at the tenth lens surface or image facing surface of the lens E6 (or E6(A) in this alternative embodiment) which is the image-side lens of the doublet E5/E6. Another alternative to having aspheric departure on the twelfth surface, as in the illustrated example of FIG. 9A, or on the fifteenth surface, as in the illustrated example of FIG. 1A, is to instead provide aspheric curvature on the fourteenth lens surface, which is the object facing surface of the lens E8(A) in the FIG. 9A example, and is the image facing surface of the lens E7(A) in the FIG. 1A example. Other surfaces of the lens groups G2 and G3 could also have aspheric departures that could benefit, albeit to a lesser extent than the aforementioned optical surfaces primarily of lens group G3, the versatility and optical design characteristics of an optical assembly of a point action camera.

While an exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention.

In addition, in methods that may be performed according to preferred embodiments herein and that may have been described above, the operations have been described in selected typographical sequences. However, the sequences have been selected and so ordered for typographical convenience and are not intended to imply any particular order for performing the operations, except for those where a particular order may be expressly set forth or where those of ordinary skill in the art may deem a particular order to be necessary.

A group of items linked with the conjunction "and" in the above specification should not be read as requiring that each and every one of those items be present in the grouping in accordance with all embodiments of that grouping, as various embodiments will have one or more of those elements replaced with one or more others. Furthermore, although items, elements or components of the invention may be described or claimed in the singular, the plural is contemplated to be within the scope thereof unless limitation to the singular is explicitly stated or clearly understood as necessary by those of ordinary skill in the art.

The presence of broadening words and phrases such as "one or more," "at least," "but not limited to" or other such as phrases in some instances shall not be read to mean that the narrower case is intended or required in instances where such broadening phrases may be absent. The use of the term "assembly" does not imply that the components or functionality described or claimed as part of the assembly are all configured in a common package. Indeed, any or all of the various components of a assembly, e.g., optical group 1 and optical group 2, may be combined in a single package or separately maintained and may further be manufactured, assembled or distributed at or through multiple locations.

Different materials may be used to form the lenses of the optical assemblies of the several embodiments. For example, various kinds of glass and/or transparent plastic or polymeric materials may be used. Examples include polyimides. Among the polymeric materials are high refractive index polymers, or HRIPs, with refractive indices typically above 1.5 (see, e.g., Hung-Ju Yen and Guey-Sheng Liou (2010). "A facile approach towards optically isotropic, colorless, and thermoplastic polyimidothioethers with high refractive index". J. Mater. Chem. 20 (20): 4080; H. Althues, J. Henle and S. Kaskel (2007). "Functional inorganic nanofillers for transparent polymers". Chem. Soc. Rev. 9 (49): 1454-65; Akhmad Herman Yuwono, Binghai Liu, Junmin Xue, John Wang, Hendry Izaac Elim, Wei Ji, Ying Li and Timothy John White (2004). "Controlling the crystallinity and nonlinear optical properties of transparent $TiO_2$-PMMA nanohybrids". J. Mater. Chem. 14 (20): 2978; Naoaki Suzuki, Yasuo Tomita, Kentaroh Ohmori, Motohiko Hidaka and Katsumi Chikama (2006). "Highly transparent ZrO2 nanoparticle-dispersed acrylate photopolymers for volume holographic recording". Opt. Express 14 (26): 012712, which are incorporated by reference).

Optical image stabilization techniques may be included in a point action camera in accordance with certain embodiments. For examples, techniques described at U.S. Pat. Nos. 8,649,628, 8,649,627, 8,417,055, 8,351,726, 8,264,576, 8,212,882, 8,593,542, 8,509,496, 8,363,085, 8,330,831, 8,648,959, 8,637,961, 8,587,666, 8,604,663, 8,521,017, 8,508,652, 8,358,925, 8,264,576, 8,199,222, 8,135,184 and 8,184,967, and US published patent applications nos. 2012/0121243, 2012/0207347, 2012/0206618, 2013/0258140, 2013/0201392, 2013/0077945, 2013/0076919, 2013/0070126, 2012/0019613, 2012/0120283, and 2013/0075237 which are hereby incorporated by reference, may be used.

Additionally, the various embodiments set forth herein are described in terms of exemplary schematic diagrams and other illustrations. As will be apparent to one of ordinary skill in the art after reading this document, the illustrated embodiments and their various alternatives may be implemented without confinement to the illustrated examples. For example, schematic diagrams and their accompanying description should not be construed as mandating a particular architecture or configuration.

Point action cameras in accordance with several further embodiments are described herein. Several examples of point action cameras that can be efficiently manufactured are illustrated in the text with reference to accompanying drawings. Certain optical parts of the point action camera such as one or more lenses, mirrors and/or apertures, a shutter, a housing or barrel for holding certain optics, a lens or a lens barrel, or other optic such as a mirror, light source, secondary sensor, accelerometer, gyroscope, power connection, a data storage chip, a microprocessor, a wired or wireless transmission/reception connection and/or receiver/transmitter, or housing alignment and/or coupling pins or recesses or other such structures may be included in certain embodiments even if they have not been specifically described or illustrated herein. It is noted that in certain embodiments, a shutter is included, while in other embodiments, the point action camera does not have a shutter. A flash may or may not be included in any of these camera embodiments.

In certain embodiments, a wide field of view is desired in only a single dimension. In such cases, the principles described herein can be reduced to cylindrical applications of any of the spherical examples provided.

In addition, all references cited above and below herein, as well as the background, invention summary, abstract and brief description of the drawings, are all incorporated by reference into the detailed description of the preferred embodiments as disclosing alternative embodiments. Several embodiments of point action cameras have been described herein and schematically illustrated by way of example physical, electronic and optical architectures. Other point action camera embodiments and embodiments of features and components of point action cameras that may be included within alternative embodiments, may be described at one or a combination of U.S. Pat. Nos. 7,224,056, 7,683,468, 7,936,062, 7,935,568, 7,927,070, 7,858,445, 7,807,508, 7,569,424, 7,449,779, 7,443,597, 7,449,779, 7,768,574, 7,593,636, 7,566,853, 7,858,445, 7,936,062, 8,005,268, 8,014,662, 8,090,252, 8,004,780, 8,119,516, 8,873,167, 7,920,163, 7,747,155, 7,368,695, 7,095,054, 6,888,168, 6,844,991, 6,583,444, and/or 5,882,221, and/or US published patent applications nos. 2013/0270419, 2013/0258140, 2014/0028887, 2014/0043525, 2012/0063761, 2011/0317013, 2011/0255182, 2011/0274423, 2010/0053407, 2009/0212381, 2009/0023249, 2008/0296,717, 2008/0099907, 2008/0099900, 2008/0029879, 2007/0190747, 2007/0190691, 2007/0145564, 2007/0138644, 2007/0096312, 2007/0096311, 2007/0096295, 2005/0095835, 2005/0087861, 2005/0085016, 2005/0082654, 2005/0082653, and/or 2005/0067688. All of these patents and published patent applications are incorporated by reference.

U.S. Pat. Nos. 7,593,636, 7,768,574, 7,807,508 and 7,244,056 which are incorporated by reference describe examples of structures where the electrical height of a camera device is nested within the optical height to decrease the physical height. An advantageously compact point action camera is provided herein in alternative embodiments. Point action cameras that have an advantageously low ratio of optical length (or physical size or height) to effective focal length, or TTL/EFL, are provided herein. In specifically described examples, optical assemblies with TTL/EFL ratios below 8.0 are provided.

US2013/0242080 which is also incorporated by reference describes examples of point action cameras or camera modules disposed within watertight compartments. A mechanism may be provided for optical and/or electrical communication of image data that does not involve breaking the watertight seal of the housing within which the point action camera resides.

What is claimed is:
1. A digital point action camera, comprising
an optical assembly for a point action camera having a wide field of view, comprising multiple lens elements, including one or more aspheric lens surfaces, configured to provide a field of view in excess of 120 degrees; and
an image sensor disposed approximately at a focal plane of the optical assembly; and
a digital camera housing including electronics and a user interface, and containing said optical assembly and said image sensor in optically effective relative disposition; and
wherein the optical assembly comprises, from object end to image end:

a first optical group including two lens elements configured to collect and reduce a field angle of light incident at said wide field of view;

a second optical group, including three lens elements; and a third optical group including two doublets and a singlet disposed between the two doublets, and an aperture stop between said second and third optical groups, and wherein said singlet of said third optical group includes an aspheric surface that is configured to compensate higher order astigmatism, and wherein said digital camera comprises a MTF at 200 lp/mm above 0.35 and a MTF at 100 lp/mm above 0.55.

2. The digital camera of claim 1, wherein a ratio of a diameter of a first lens element at the object end of the optical assembly to an image diagonal is less than approximately 3.

3. The digital camera of claim 1, wherein a diameter of a first lens element at the object end of the optical assembly; is less than 30 mm.

4. The digital camera of claim 1, comprising less than five microns of lateral chromatic aberration.

5. The digital camera of claim 1, comprising a ratio of total track length, from the object end of the optical assembly to the focal plane, to effective focal length of the optical assembly (hereinafter "TTL/EFL") that is less than 12.

6. The digital camera of claim 1, wherein a total track length TTL, from the object end of the optical assembly to the focal plane, is less than 10 cm.

7. The digital camera of claim 1, wherein the second group comprises a positive focal length in a range between 10 mm and 25 mm.

8. The digital camera of claim 1, wherein the second optical group is spaced apart from the first optical group by approximately 27.5 mm.

9. The digital camera of claim 8, wherein said first optical group comprises a convexo-concave or meniscus lens.

10. The digital camera of claim 8, wherein said second optical group is spaced apart from the third optical group by approximately 12.1 mm.

11. The digital camera of claim 8, wherein the first optical group comprises a negative focal length in a range between −5 mm and −20 mm.

12. The digital camera of claim 8, wherein the third optical group further comprises a positive focal length of approximately 41.878 mm.

13. The digital camera of claim 1, wherein at least one aspheric surface comprises an aspheric sag less than approximately 12 microns.

14. The digital camera of claim 1, wherein at least one aspheric surface comprises an aspheric sag slope less than approximately 15 microns per millimeter.

15. The digital camera of claim 1, comprising a single aspheric lens element, which is the only aspheric lens element within the optical assembly, wherein lens elements other than the single aspheric lens element comprise spherical or planar lens surfaces, or both, each without significant aspheric departure.

16. The digital camera of claim 1, comprising a single aspheric lens surface, which is the only aspheric lens surface within the optical assembly, wherein lens surfaces other than said aspheric lens surface comprise spherical or planar lens surfaces, or both, each without significant aspheric departure.

17. The digital camera of claim 1, comprising only one aspheric lens element.

18. The digital camera of claim 1, comprising only one aspheric lens surface.

19. The digital camera of claim 1, wherein a stray light irradiance ratio is below 1/10,000.

20. The digital camera of claim 1, wherein a stray light power ratio is below 1/100.

21. The digital camera of claim 1, wherein axial chromatic aberration is less than 0.025 microns.

22. The digital camera of claim 21, wherein the axial chromatic aberration is defined by a ray trace at 0.7 zonal in the stop, and across a spectral band between 465 nm to 650 nm.

* * * * *